(12) United States Patent
Koh et al.

(10) Patent No.: US 10,556,412 B2
(45) Date of Patent: Feb. 11, 2020

(54) COMPOSITION FOR ADHESION LAYER OF GAS BARRIER ADHESIVE SHEET, GAS BARRIER ADHESIVE SHEET, AND OPTICAL SHEET HAVING GAS BARRIER ADHESIVE SHEET

(71) Applicant: SAMSUNG ELECTRONICS CO., LTD., Suwon-si, Gyeonggi-do (KR)

(72) Inventors: Haeng Deog Koh, Hwaseong-si (KR); Eun Joo Jang, Suwon-si (KR); Hyun A Kang, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 654 days.

(21) Appl. No.: 14/815,380

(22) Filed: Jul. 31, 2015

(65) Prior Publication Data

US 2016/0032160 A1 Feb. 4, 2016

(30) Foreign Application Priority Data

Aug. 1, 2014 (KR) .................. 10-2014-0099051

(51) Int. Cl.
*C09J 183/08* (2006.01)
*B32B 27/40* (2006.01)
(Continued)

(52) U.S. Cl.
CPC ............... *B32B 27/40* (2013.01); *B32B 7/12* (2013.01); *B32B 27/308* (2013.01); *B32B 27/38* (2013.01);
(Continued)

(58) Field of Classification Search
CPC ....... B32B 27/08; B32B 27/308; B32B 27/36; B32B 27/40; B32B 27/42; B32B 27/38;
(Continued)

(56) References Cited

U.S. PATENT DOCUMENTS 7,449,519 B2 11/2008 Sato et al.
8,871,350 B2 10/2014 Nakayama et al.
(Continued)

FOREIGN PATENT DOCUMENTS

CN 101916813 A * 12/2010 ............ H01L 33/50
JP 5986001 5/1984
(Continued)

OTHER PUBLICATIONS

Hwa-Min Kim, et al., "Enhanced Properties of Transparent Conductive Oxide Films Prepared on PEN Substrates with a (SiO) (ZnO) Gas Barrier Layer", Journal of the Korean Physical Society, vol. 5, No. 1, Jul. 2009, pp. 197-201.
(Continued)

*Primary Examiner* — Eli D. Strah
(74) *Attorney, Agent, or Firm* — Cantor Colburn LLP

(57) ABSTRACT

A composition for an adhesion layer of a gas barrier adhesive sheet including a gas blocking film and an adhesion layer including at least one compound selected from a compound represented by Chemical Formula 1, at least one compound selected from a compound represented by Chemical Formula 2, and optionally, a compound represented by Chemical Formula 3.

Chemical Formula 1
$$[R^2\!\!\underset{k3}{\dagger}\!\!-\!L_2\!-\!\!\dagger\!Y_2\!-\!(X)_n]_{k4}$$

Chemical Formula 2
$$[R^1\!\!\underset{k1}{\dagger}\!\!-\!L_1\!-\!\!\dagger\!Y_1\!-\!(SH)_m]_{k2}$$

Chemical Formula 3

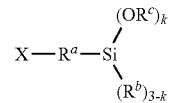

(Continued)

---

Adhesion layer

Gas barrier layer

Protective layer wherein groups and variables in Chemical Formulae 1 to 3 are the same as described in the specification.

20 Claims, 8 Drawing Sheets

(51) Int. Cl.
  *B32B 7/12* (2006.01)
  *B32B 27/30* (2006.01)
  *B32B 27/38* (2006.01)
(52) U.S. Cl.
  CPC ..... *B32B 2307/422* (2013.01); *B32B 2551/00* (2013.01); *Y10T 428/105* (2015.01); *Y10T 428/1036* (2015.01)
(58) Field of Classification Search
  CPC ... B32B 7/12; B32B 2255/20; B32B 2255/10; B32B 2457/206; B32B 2457/14; B32B 2307/7242; B32B 2551/00; B32B 2307/422; C09J 4/00; C09J 7/0239; C09J 2433/00; C09J 2203/318; C09J 7/22; C09J 7/30; C09J 7/38; C09J 2201/60; C09J 201/02; C08K 5/378; C08K 5/3492; C08K 5/5415; C08K 2201/008; C08K 5/548; Y10T 428/105; Y10T 428/1036
  See application file for complete search history.

(56) References Cited

U.S. PATENT DOCUMENTS

| | | | |
|---|---|---|---|
| 2009/0061223 A1* | 3/2009 | Tsukahara | B32B 7/12 428/349 |
| 2009/0253805 A1 | 10/2009 | Hoyle et al. | |
| 2011/0236706 A1 | 9/2011 | Uebayashi et al. | |
| 2012/0001217 A1* | 1/2012 | Kang | C08G 75/045 257/98 |
| 2012/0031485 A1 | 2/2012 | Hoshi et al. | |
| 2012/0071579 A1 | 3/2012 | Kitano et al. | |
| 2012/0113672 A1* | 5/2012 | Dubrow | B82Y 20/00 362/602 |
| 2014/0150864 A1 | 6/2014 | Hoshi et al. | |
| 2014/0178622 A1* | 6/2014 | Fuchi | C09J 7/0217 428/41.8 |

FOREIGN PATENT DOCUMENTS

| | | | |
|---|---|---|---|
| JP | 2003277505 A | * 10/2003 | |
| JP | 2005154543 A | * 6/2005 | |
| JP | 2010248455 | 11/2010 | |
| JP | WO 2013147189 A1 | * 10/2013 | ............. C23C 14/12 |
| KR | 20110065482 | 6/2011 | |
| KR | 20110076719 | 7/2011 | |
| KR | 1111927 | 1/2012 | |
| KR | 20120003913 | 1/2012 | |
| KR | 20120022627 | 3/2012 | |
| KR | 20120022745 | 3/2012 | |
| KR | 20130058379 | 6/2013 | |
| KR | 20130113666 | 10/2013 | |
| KR | 20140064814 | 5/2014 | |
| WO | 2004074330 | 9/2004 | |

OTHER PUBLICATIONS

Thierry Materne, et al., "Organosilane Technology in Coating Applications: Review and Perspectives", Chem. Mater., (13) 3422, 2001.

* cited by examiner

COMPOSITION FOR ADHESION LAYER OF GAS BARRIER ADHESIVE SHEET, GAS BARRIER ADHESIVE SHEET, AND OPTICAL SHEET HAVING GAS BARRIER ADHESIVE SHEET

CROSS-REFERENCE TO RELATED APPLICATION

This application claims priority to and the benefit of Korean Patent Application No. 10-2014-0099051 filed in the Korean Intellectual Property Office on Aug. 1, 2014, the entire contents of which are incorporated herein by reference.

BACKGROUND

1. Field

A composition for an adhesion layer of a gas barrier adhesive sheet, a gas barrier adhesive sheet manufactured from the composition, and an optical sheet including the gas barrier adhesive sheet are disclosed.

2. Description of the Related Art

In development of an organic light emitting diode (OLED) or a thin film transistor, and an optical sheet by applying a semiconductor nanocrystal material, two barrier films are necessarily laminated on a top surface or a bottom surface of the optical sheet to prevent the optical sheet from contacting moisture and oxygen.

A gas barrier film is formed by using an inorganic material such a silica ($SiO_2$) through deposition and liquid-phase processes on a polymer film such as PET (polyethyleneterephthalate), PES (polyethylene sulfone), or PEN (polyethylene naphthalate). A silica layer intrinsically has strong hydrophilicity and when a polymer or organic material layer is formed thereon, it may be easily delaminated on the interface. This interlayer delamination may allow moisture and oxygen to infiltrate through the interface during manufacture of a device and cause a faulty product.

On the other hand, recently, research on manufacture of an optical sheet by dispersing semiconductor nanocrystals into a polymer matrix resin has been actively conducted. Since quantum efficiency of the semiconductor nanocrystals sharply decreases due to moisture, oxygen, or the like, the optical sheet including the semiconductor nanocrystals needs to be equipped with a gas barrier film on one surface or both surfaces.

Thus, there remains a need in a gas barrier adhesive sheet, in which the delamination between a gas barrier layer and an adhesion layer is prevented.

SUMMARY

An embodiment provides a composition for an adhesion layer of a gas barrier adhesive sheet for preventing delamination between a gas barrier layer and an adhesion layer in the gas barrier adhesive sheet.

Another embodiment provides a gas barrier adhesive sheet including an adhesion layer manufactured using the composition for an adhesion layer.

In yet another embodiment, a semiconductor nanocrystal-containing optical sheet equipped with the gas barrier adhesive sheet is provided.

In still another embodiment, an optical device including the semiconductor nanocrystal-containing optical sheet equipped with the gas barrier adhesive sheet is provided.

In an embodiment, a composition for an adhesion layer of a gas barrier adhesive sheet including a gas blocking film and an adhesion layer includes at least one compound selected from a compound represented by Chemical Formula 1 and a compound represented by Chemical Formula 2; and a compound represented by Chemical Formula 3.

Chemical Formula 1

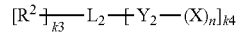

In Chemical Formula 1,

X is an aliphatic organic group including a carbon-carbon double bond or a carbon-carbon triple bond, an aromatic organic group including a carbon-carbon double bond or a carbon-carbon triple bond, or an alicyclic organic group including a carbon-carbon double bond or a carbon-carbon triple bond, $R^2$ is selected from hydrogen; a substituted or unsubstituted C1 to C30 linear or branched alkyl group; a substituted or unsubstituted C6 to C30 aryl group; a substituted or unsubstituted C3 to C30 heteroaryl group; a substituted or unsubstituted C3 to C30 cycloalkyl group; a substituted or unsubstituted C3 to C30 heterocycloalkyl group; a C1 to C10 alkoxy group; a hydroxy group; $NH_2$; —NRR' wherein R and R' are independently hydrogen or a C1 to C30 linear or branched alkyl group; an isocyanate group; a halogen; —ROR' wherein R is a substituted or unsubstituted C1 to C20 alkylene group and R' is hydrogen or a C1 to C20 linear or branched alkyl group; —RC(=O)X wherein R is a substituted or unsubstituted alkylene group, and X is a halogen; —C(=O)OR' wherein R' is hydrogen or a C1 to C20 linear or branched alkyl group; —CN; or —C(=O)ONRR' wherein R and R' are independently hydrogen or a C1 to C20 linear or branched alkyl group, $L_2$ is a carbon atom, a substituted or unsubstituted C1 to C30 alkylene group, a substituted or unsubstituted C6 to C30 cycloalkylene group, a substituted or unsubstituted C6 to C30 arylene group, or a substituted or unsubstituted C3 to C30 heteroarylene group, $Y_2$ is a single bond; a substituted or unsubstituted C1 to C30 alkylene group; a substituted or unsubstituted C2 to C30 alkenylene group; or a substituted or unsubstituted C1 to C30 alkylene group or a substituted or unsubstituted C2 to C30 alkenylene group, wherein at least one —$CH_2$— may be replaced with —$S(=O)_2$—, —C(=O)—, —O—, —S—, —S(=O)—, —C(=O)O—, or —C(=O)NR— wherein R is hydrogen or a C1 to C10 linear or branched alkyl group, —NR— wherein R is hydrogen or a C1 to C10 linear or branched alkyl group, or a combination thereof, n is an integer of 1 or more, k3 is an integer of 0 or 1 or more, k4 is an integer of 1 or more, provided that the sum of n and k4 is 2 or more (e.g., an integer of 3 or more), n does not exceed the valence of $Y_2$, and the sum of k3 and k4 does not exceed the valence of $L_2$.

Chemical Formula 2

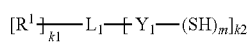

In Chemical Formula 2, $R^1$ is selected from hydrogen; a substituted or unsubstituted C1 to C30 linear or branched alkyl group; a substituted or unsubstituted C6 to C30 aryl group; a substituted or unsubstituted C3 to C30 heteroaryl group; a substituted or unsubstituted C3 to C30 cycloalkyl group; a substituted or unsubstituted C3 to C30 heterocycloalkyl group; a C1 to C10 alkoxy group; a hydroxy group; —NH$_2$; —NRR' wherein R and R' are independently hydrogen or a C1 to C30 linear or branched alkyl group; an isocyanate group; a halogen; —ROR' wherein R is a substituted or unsubstituted C1 to C20 alkylene group and R' is hydrogen or a C1 to C20 linear or branched alkyl group; —RC(=O)X wherein R is a substituted or unsubstituted alkylene group and X is a halogen; —C(=O)OR' wherein R' is hydrogen or a C1 to C20 linear or branched alkyl group; —CN; or —C(=O)ONRR' wherein R and R' are independently hydrogen or a C1 to C20 linear or branched alkyl group, L$_1$ is a carbon atom, a substituted or unsubstituted C1 to C30 alkylene group, a substituted or unsubstituted C6 to C30 cycloalkylene group, a substituted or unsubstituted C6 to C30 arylene group, or a substituted or unsubstituted C6 to C30 heteroarylene group, wherein at least one —CH$_2$— in the substituted C1 to C30 alkylene group may be replaced with —SO$_2$—, —C(O)—, —O—, —S—, —SO—, —C(=O)O—, or —C(=O)NR— wherein R is hydrogen or a C1 to C10 alkyl group, or a combination thereof, Y$_1$ is a single bond; a substituted or unsubstituted C1 to C30 alkylene group; a substituted or unsubstituted C2 to C30 alkenylene group; a substituted or unsubstituted C1 to C30 alkylene group or a substituted or unsubstituted C2 to C30 alkenylene group, wherein at least one —CH$_2$— may be replaced with —S(=O)$_2$—, —C(=O)—, —O—, —S—, —S(=O)—, —C(=O)O—, or —C(=O)NR— wherein R is hydrogen or a C1 to C10 linear or branched alkyl group, —NR— wherein R is hydrogen or a C1 to C10 linear or branched alkyl group, or a combination thereof, m is an integer of 1 or more,
k1 is an integer of 0 or 1 or more,
k2 is an integer of 1 or more,
provided that the sum of m and k2 is 2 or more (e.g., an integer of 3 or more), m does not exceed the valence of Y$_1$, and the sum of k1 and k2 does not exceed the valence of L$_1$.

Chemical Formula 3

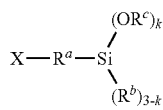

In Chemical Formula 3,
R$^a$ is a C1 to C20 alkylene group, a C1 to C20 alkenylene group, a C1 to C20 alkynylene group, or a C1 to C20 arylene group,
R$^b$ and R$^c$ are the same or different and are each independently a C1 to C20 aliphatic or alicyclic hydrocarbon group,
X is a (meth)acrylate group, a mercapto group, or an epoxy group, and
k is an integer of 1 to 3.

The composition for an adhesion layer of a gas barrier adhesive sheet may include the compound of Chemical Formula 1, the compound of Chemical Formula 2, and the compound of Chemical Formula 3.

The composition for an adhesion layer of a gas barrier adhesive sheet may include about 70 percent by weight to about 99 percent by weight of the at least one compound of the compound represented by Chemical Formula 1 and the compound represented by Chemical Formula 2, and about 1 percent by weight to about 30 percent by weight of the compound represented by Chemical Formula 3, based on the total weight of the composition.

In Chemical Formula 1, X may be selected from an acrylate group; a methacrylate group; a C2 to C30 alkenyl group; a C2 to C30 alkynyl group; a substituted or unsubstituted C3 to C30 alicyclic organic group including a carbon-carbon double bond or a carbon-carbon triple bond in the ring; a substituted or unsubstituted C3 to C30 heterocycloalkyl group including a carbon-carbon double bond or a carbon-carbon triple bond in the ring; a C3 to C30 alicyclic organic group substituted with a C2 to C30 alkenyl group or a C2 to C30 alkynyl group; or a C3 to C30 heterocycloalkyl group substituted with a C2 to C30 alkenyl group or a C2 to C30 alkynyl group.

The substituted or unsubstituted C3 to C30 alicyclic organic group including a carbon-carbon double bond or a carbon-carbon triple bond in the ring may be selected from a norbornene group, a maleimide group, a nadimide group, a tetrahydrophthalimide group, or a combination thereof.

The compound represented by Chemical Formula 1 may be a C4 to C100 diallyl compound, a C4 to C100 triallyl compound, a C4 to C100 diallyl ether compound, a C4 to C100 triallyl ether compound, a C4 to C100 di(meth)acrylate compound, a C4 to C100 tri(meth)acrylate compound, a divinyl ether compound, or a combination thereof.

In Chemical Formula 1, L$^2$ may be a group including a pyrrolidine residual group, a tetrahydrofuran residual group, a pyridine residual group, a pyrimidine residual group, a piperidine residual group, a triazine residual group, or an isocyanurate residual group.

The compound represented by Chemical Formula 1 may be a compound represented by Chemical Formula 1-1, Chemical Formula 1-2, or Chemical Formula 1-3.

Chemical Formula 1-1

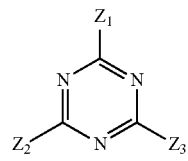

Chemical Formula 1-2

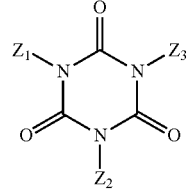

In Chemical Formulae 1-1 and 1-2, Z$_1$ to Z$_3$ independently correspond to *—Y$_2$(X)$_n$ of Chemical Formula 1.

Chemical Formula 1-3

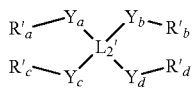

In Chemical Formula 1-3,
L$_2$' is carbon; a substituted or unsubstituted C1 to C30 alkylene group; a substituted or unsubstituted C2 to C30 alkenylene group; a substituted or unsubstituted C1 to C30 alkylene group, wherein at least one —CH$_2$— is replaced with —S(=O)$_2$—, —C(=O)—, —O—, —S—, —S(=O)—, —C(=O)O—, —C(=O)NR— wherein R is hydrogen or a C1 to C10 linear or branched alkyl group, —NR— wherein R is hydrogen or a C1 to C10 linear or branched alkyl group, a C6 to C10 cycloalkylene group, or a combination thereof; a substituted or unsubstituted C2 to C30 alkenylene group, wherein at least one —CH$_2$— is replaced with —S(=O)$_2$—, —C(=O)—, —O—, —S—, —S(=O)—, —C(=O)O—, —C(=O)NR— wherein R is hydrogen or a C1 to C10 linear or branched alkyl group, —NR— wherein R is hydrogen or a C1 to C10 linear or branched alkyl group, a C6 to C10 cycloalkylene group, or a combination thereof; a substituted or unsubstituted C6 to C30 arylene group; a substituted or unsubstituted C3 to C30 heteroarylene group; a substituted or unsubstituted C3 to C30 cycloalkylene group; or a substituted or unsubstituted C3 to C30 heterocycloalkylene group, $Y_a$ to $Y_d$ are independently a single bond; a substituted or unsubstituted C1 to C30 alkylene group; a substituted or unsubstituted C2 to C30 alkenylene group; or a substituted or unsubstituted C1 to C30 alkylene group or a substituted or unsubstituted C2 to C30 alkenylene group, wherein at least one —CH$_2$— is replaced with —S(=O)$_2$—, —C(=O)—, —O—, —S—, —S(=O)—, —C(=O)O—, or —C(=O)NR— wherein R is hydrogen or a C1 to C10 linear or branched alkyl group, —NR— wherein R is hydrogen or a C1 to C10 linear or branched alkyl group, or a combination thereof, $R'_a$ to $R'_d$ are $R^2$ or X of Chemical Formula 1, provided that at least one of $R'_a$ to $R'_d$ is X of Chemical Formula 1.

The compound represented by Chemical Formula 1 may include a compound represented by Chemical Formula 1-4, a compound represented by Chemical Formula 1-5, a compound represented by Chemical Formula 1-6, a compound represented by Chemical Formula 1-7, a compound represented by Chemical Formula 1-8, a compound represented by Chemical Formula 1-9, a compound represented by Chemical Formula 1-10, a compound represented by Chemical Formula 1-11, or a combination thereof.

Chemical Formula 1-4

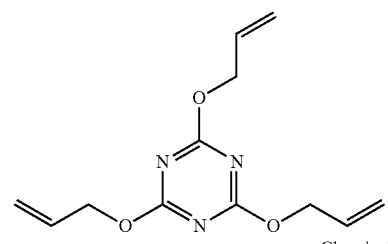

Chemical Formula 1-5

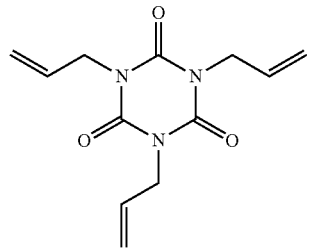

Chemical Formula 1-6

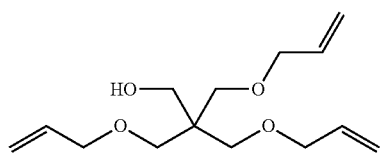

Chemical Formula 1-7

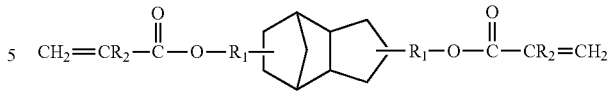

In Chemical Formula 1-7,
each $R_1$ is independently a substituted or unsubstituted C1 to C20 alkylene group, wherein at least one —CH$_2$— may be replaced with —S(=O)$_2$—, —C(=O)—, —O—, —S—, —S(=O)—, —C(=O)O—, —C(=O)NR— wherein R is hydrogen or a C1 to C10 linear or branched alkyl group, —NR— wherein R is hydrogen or a C1 to C10 linear or branched alkyl group, or a combination thereof, and
each $R_2$ is independently hydrogen or a methyl group.

Chemical Formula 1-8

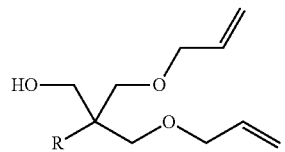

In Chemical Formula 1-8, R is a C1 to C10 alkyl group.

Chemical Formula 1-9

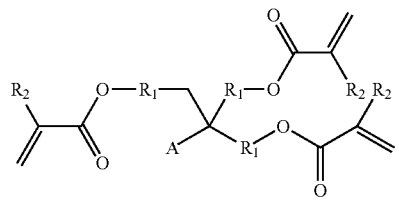

In Chemical Formula 1-9,
A is a C1 to C10 alkyl group or a hydroxy group,
each $R_1$ is the same or different and is independently a single bond, a substituted or unsubstituted C1 to C20 alkylene group, wherein at least one —CH$_2$— may be replaced with —S(=O)$_2$—, —C(=O)—, —O—, —S—, —S(=O)—, —C(=O)O—, —C(=O)NR— wherein R is hydrogen or a C1 to C10 linear or branched alkyl group, —NR— wherein R is hydrogen or a C1 to C10 linear or branched alkyl group, or a combination thereof, and
each $R_2$ is independently hydrogen or a methyl group.

Chemical Formula 1-10

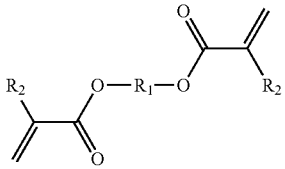

In Chemical Formula 1-10,
$R_1$ is a single bond, a substituted or unsubstituted C1 to C20 alkylene, at least one —CH$_2$— may be replaced with —S(=O)$_2$—, —C(=O)—, —O—, —S—, —S(=O)—, —C(=O)O—, —C(=O)NR— wherein R is hydrogen or a C1 to C10 linear or branched alkyl group, —NR— wherein R is hydrogen or a C1 to C10 linear or branched alkyl group, or a combination thereof, and R$_2$ is independently hydrogen or a methyl group.

Chemical Formula 1-11

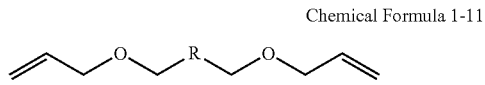

In Chemical Formula 1-11, R is a single bond, a substituted or unsubstituted C1 to C20 alkylene, wherein at least one —CH$_2$— may be replaced with —S(=O)$_2$—, —C(=O)—, —O—, —S—, —S(=O)—, —C(=O)O—, —C(=O)NR'— wherein R' is hydrogen or a C1 to C10 linear or branched alkyl group, —NR'— wherein R' is hydrogen or a C1 to C10 linear or branched alkyl group, or a combination thereof.

Chemical Formula 1-12

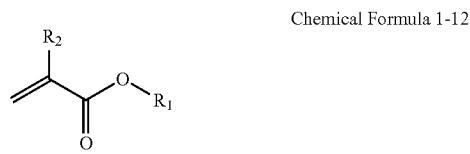

In Chemical Formula 1-12, R$_1$ is a C4 to C20 linear or branched alkyl group, and R$_2$ is hydrogen or a methyl group.

The above compound of Chemical Formula 2 may include a compound of Chemical Formula 2-1:

Chemical Formula 2-1

In Chemical Formula 2-1,

L$_1$' is carbon, a substituted or unsubstituted C6 to C30 arylene group; a substituted or unsubstituted C3 to C30 heteroarylene group; a substituted or unsubstituted C3 to C30 cycloalkylene group; or a substituted or unsubstituted C3 to C30 heterocycloalkylene group, Y$_a$ to Y$_d$ are independently a single bond; a substituted or unsubstituted C1 to C30 alkylene group; a substituted or unsubstituted C2 to C30 alkenylene group; or a substituted or unsubstituted C1 to C30 alkylene group or C2 to C30 alkenylene group, wherein at least one —CH$_2$— may be replaced with —S(=O)$_2$—, —C(=O)—, —O—, —S—, —S(=O)—, —C(=O)O—, —C(=O)NR— wherein R is hydrogen or a C1 to C10 linear or branched alkyl group, —NR— wherein R is hydrogen or a C1 to C10 linear or branched alkyl group, or a combination thereof, and R$_a$ to R$_d$ are R$^1$ or SH of Chemical Formula 2, provided that at least one of R$_a$ to R$_d$ is SH.

The compound of Chemical Formula 2 may be a compound represented by Chemical Formula 2-2, a compound represented by Chemical Formula 2-3, a compound represented by Chemical Formula 2-4, a compound represented by Chemical Formula 2-5, a compound represented by Chemical Formula 2-6, or a combination thereof.

Chemical Formula 2-2

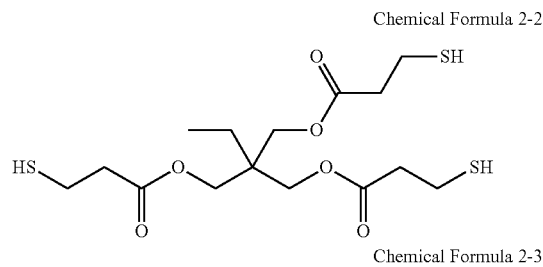

Chemical Formula 2-3

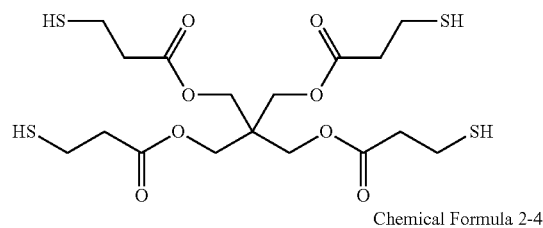

Chemical Formula 2-4

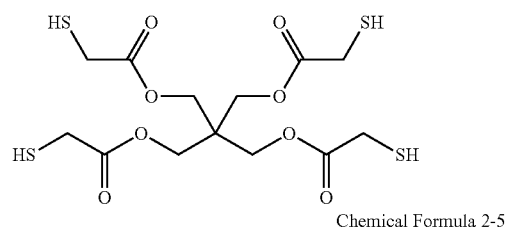

Chemical Formula 2-5

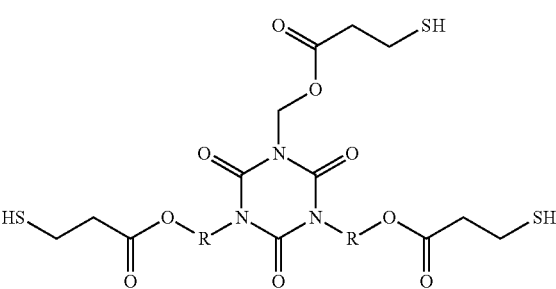

In Chemical Formula 2-5, R is a substituted or unsubstituted C1 to C10 alkylene.

Chemical Formula 2-6

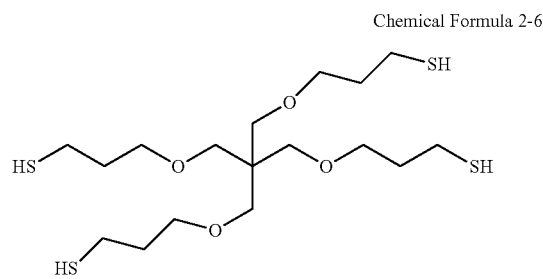 [SMILES: SCCCOCC(COCCCS)(COCCCS)COCCCS]

The compound represented by Chemical Formula 3 may be N-mercaptopropyltrimethoxysilane or 3-(trimethoxysilyl)propylmethacrylate.

In another embodiment, a gas barrier adhesive sheet including a gas barrier layer and an adhesion layer disposed on the gas barrier layer, wherein the adhesion layer is a product of the composition according to the embodiment.

The adhesion layer may be manufactured by coating the composition on the gas barrier layer and curing the composition.

The adhesion layer may be manufactured by coating the above compound of Chemical Formula 3 of the composition on the gas barrier layer followed by curing the compound, and then coating a mixture including at least one of the compound of Chemical Formula 1 and the compound of Chemical Formula 2 thereon followed by curing the mixture.

The curing may include photocuring, thermal curing, or a combination thereof.

In the gas barrier adhesive sheet, the gas barrier layer may include $SiO_2$, $TiO_2$, $ZrO_2$, $ZnO_2$, $Al_2O_3$, indium tin oxide, or a combination thereof.

The gas barrier adhesive sheet may further include a protective layer disposed on a side of the gas barrier layer, which is opposite to a side on which the adhesion layer is disposed.

The protective layer may include polyethylene terephthalate, polyethylene sulfone, or polyethylene naphthalate.

In yet another embodiment, an optical sheet including the gas barrier adhesive sheet according to the embodiment may be provided.

The optical sheet may include a semiconductor nanocrystal enclosed in a polymer matrix.

The polymer matrix may include poly(meth)acrylate, epoxy, polyurea, or polyurethane. The polymer matrix may further include a polymerized product of at least one compound selected from the compound represented by Chemical Formula 1 and at least one compound selected from the compound represented by Chemical Formula 2 in the matrix resin.

In still another embodiment, an optical device including the optical sheet according to the embodiment is provided.

The optical device may be a backlight unit or a liquid crystal display.

BRIEF DESCRIPTION OF THE DRAWINGS

The above and other aspects, advantages and features of this disclosure will become more apparent by describing in further detail exemplary embodiments thereof with reference to the accompanying drawings, in which.

DETAILED DESCRIPTION

Figure 1A:
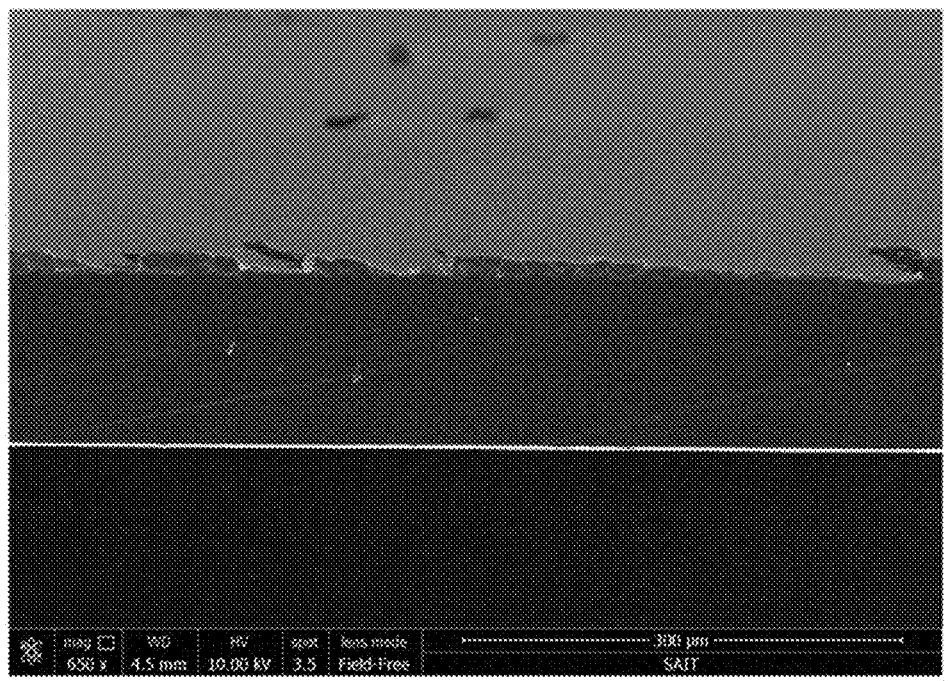
FIG. 1A is a scanning electron microscope (SEM) photograph showing the cross-section of a gas barrier adhesive sheet according to an exemplary embodiment.

This disclosure will be described more fully hereinafter in the following detailed description, in which some but not all embodiments of this disclosure are described. This disclosure may be embodied in many different forms and should not be construed as limited to the embodiments set forth herein. Accordingly, the embodiments are merely described below, by referring to the figures, to explain aspects of the present description. As used herein, the term "and/or" includes any and all combinations of one or more of the associated listed items. The term "or" means "and/or." Expressions such as "at least one of", when preceding a list of elements, modify the entire list of elements and do not modify the individual elements of the list.

It will be understood that when an element is referred to as being "on" another element, it may be directly on the other element or intervening elements may be present therebetween. In contrast, when an element is referred to as being "directly on" another element, there are no intervening elements present.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer, or section. Thus, a first element, component, region, layer, or section discussed below could be termed a second element, component, region, layer, or section without departing from the teachings of the present embodiments.

The terminology used herein is for the purpose of describing particular embodiments only and is not intended to be limiting. As used herein, the singular forms "a," "an" and "the" are intended to include the plural forms as well, unless the context clearly indicates otherwise. The term "or" means "and/or." As used herein, the term "and/or" includes any and all combinations of one or more of the associated listed items. Expressions such as "at least one of," when preceding a list of elements, modify the entire list of elements and do not modify the individual elements of the list.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations.

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

As used herein, when a definition is not otherwise provided, the term 'substituted' refers to a group substituted with a substituent selected from a halogen atom (F, Br, Cl, or I), a hydroxy group, an alkoxy group, a nitro group, a cyano group, an amino group, an azido group, an amidino group, a hydrazino group, a hydrazono group, a carbonyl group, a carbamoyl group, a thiol group, an ester group, a carboxyl group or a salt thereof, a sulfonic acid group or a salt thereof, a phosphoric acid or a salt thereof, a C1 to C20 alkyl group, a C2 to C20 alkenyl group, a C2 to C20 alkynyl group, a C6 to C30 aryl group, a C7 to C30 arylalkyl group, a C1 to C30 alkoxy group, a C1 to C20 heteroalkyl group, a C3 to C20 heteroarylalkyl group, a C3 to C30 cycloalkyl group, a C3 to C15 cycloalkenyl group, a C6 to C15 cycloalkynyl group, a C3 to C30 heterocycloalkyl group, and a combination thereof, instead of hydrogen.

As used herein, when a definition is not otherwise provided, the term "alkyl group" refers to a group derived from a straight or branched chain saturated aliphatic hydrocarbon having the specified number of carbon atoms and having a valence of at least one.

As used herein, when a definition is not otherwise provided, the term "alkoxy group" refers to "alkyl-O—", wherein the term "alkyl" has the same meaning as described above.

As used herein, when a definition is not otherwise provided, the term "alkenyl group" refers to a straight or branched chain, monovalent hydrocarbon group having at least one carbon-carbon double bond.

As used herein, when a definition is not otherwise provided, the term "alkynyl group" refers to a straight or branched chain, monovalent hydrocarbon group having at least one carbon-carbon triple bond.

As used herein, when a definition is not otherwise provided, the term "cycloalkyl group" refers to a monovalent group having one or more saturated rings in which all ring members are carbon.

As used herein, when a definition is not otherwise provided, the term "heterocycloalkyl group" refers to a cycloalkyl group including carbon and 1 to 3 heteroatoms selected from the group consisting of N, O, S, and P as ring atoms.

As used herein, when a definition is not otherwise provided, the term "aryl", which is used alone or in combination, refers to an aromatic hydrocarbon containing at least one ring and having the specified number of carbon atoms. The term "aryl" may be construed as including a group with an aromatic ring fused to at least one cycloalkyl ring.

As used herein, when a definition is not otherwise provided, the term "heteroaryl group" refers to an aryl group including carbon and 1 to 3 heteroatoms selected from the group consisting of N, O, S, and P as ring atoms.

As used herein, when a definition is not otherwise provided, the term "arylalkyl group" refers to a substituted or unsubstituted aryl group covalently linked to an alkyl group that is linked to a compound.

As used herein, when a definition is not otherwise provided, the term "heteroarylalkyl group" refers to a substituted or unsubstituted heteroaryl group covalently linked to an alkyl group that is linked to a compound.

As used herein, when a definition is not otherwise provided, the term "alkylene group" refers to a straight or branched saturated aliphatic hydrocarbon group having a valence of at least two, optionally substituted with one or more substituents where indicated, provided that the valence of the alkylene group is not exceeded.

As used herein, when a definition is not otherwise provided, the term "alkenylene group" refers to a straight or branched aliphatic hydrocarbon group having a valence of at least two, having at least one carbon-carbon double bond, optionally substituted with one or more substituents where indicated, provided that the valence of the alkylene group is not exceeded.

As used herein, when a definition is not otherwise provided, the term "cycloalkylene group" refers to a cyclic hydrocarbon group having a valence of at least two, optionally substituted with one or more substituents where indicated, provided that the valence of the cycloalkylene group is not exceeded.

As used herein, when a definition is not otherwise provided, the term "arylene group" refers to a functional group having a valence of at least two obtained by removal of two hydrogens in an aromatic ring, optionally substituted with one or more substituents where indicated, provided that the valence of the alkylene group is not exceeded.

As used herein, when a definition is not otherwise provided, the term "heteroarylene group" refers to a functional group having a valence of at least two obtained by removal of two hydrogens in an aromatic ring, containing one to three heteroatoms selected from the group consisting of N, O, S, Si, and P as ring-forming elements, optionally substituted with one or more substituents where indicated, provided that the valence of the alkylene group is not exceeded.

As used herein, when a definition is not otherwise provided, the term "aliphatic organic group" refers to a C1 to C30 linear or branched alkyl group, the term "aromatic organic group" refers to a C6 to C30 aryl group or a C2 to C30 heteroaryl group, and the term "alicyclic organic group" refers to a C3 to C30 cycloalkyl group, a C3 to C30 cycloalkenyl group, or a C3 to C30 cycloalkynyl group.

As used herein, when a definition is not otherwise provided, the term 'hetero' refers to one including 1 to 3 heteroatoms selected from N, O, S, and P.

As used herein, when a definition is not otherwise provided, the term (meth)acrylate refers to methacrylate or acrylate, and (meth)acrylic acid refers to methacrylic acid or acrylic acid.

As used herein, when a definition is not otherwise provided, the term "mixture" as used herein is inclusive of all types of combinations, including blends, alloys, solutions, and the like.

In an embodiment, a composition for an adhesion layer of a gas barrier adhesive sheet including a gas blocking film and an adhesion layer includes at least one compound selected from a compound represented by Chemical Formula 1 and a compound selected from a compound represented by Chemical Formula 2; and a compound represented by Chemical Formula 3.

Chemical Formula 1

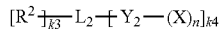

In Chemical Formula 1,

X is an aliphatic organic group including a carbon-carbon double bond or a carbon-carbon triple bond, an aromatic organic group including a carbon-carbon double bond or a carbon-carbon triple bond, or an alicyclic organic group including a carbon-carbon double bond or a carbon-carbon triple bond, $R^2$ is selected from hydrogen; a substituted or unsubstituted C1 to C30 linear or branched alkyl group; a substituted or unsubstituted C6 to C30 aryl group; a substituted or unsubstituted C3 to C30 heteroaryl group; a substituted or unsubstituted C3 to C30 cycloalkyl group; a substituted or unsubstituted C3 to C30 heterocycloalkyl group; a C1 to C10 alkoxy group; a hydroxy group; $NH_2$; a substituted or unsubstituted C1 to C30 amino group (—NRR', wherein R and R' are independently hydrogen or a C1 to C30 linear or branched alkyl group); an isocyanate group; a halogen; —ROR' (wherein R is a substituted or unsubstituted C1 to C20 alkylene group and R' is hydrogen or a C1 to C20 linear or branched alkyl group); an acyl halide (—RC(=O)X, wherein R is a substituted or unsubstituted alkylene group and X is a halogen); —C(=O)OR' (wherein R' is hydrogen or a C1 to C20 linear or branched alkyl group); —CN; or —C(=O)ONRR' (wherein R and R' are independently hydrogen or a C1 to C20 linear or branched alkyl group), $L_2$ is a carbon atom, a substituted or unsubstituted C1 to C30 alkylene group, a substituted or unsubstituted C6 to C30 cycloalkylene group, a substituted or unsubstituted C6 to C30 arylene group, or a substituted or unsubstituted C3 to C30 heteroarylene group, $Y_2$ is a single bond; a substituted or unsubstituted C1 to C30 alkylene group; a substituted or unsubstituted C2 to C30 alkenylene group; or a substituted or unsubstituted C1 to C30 alkylene group or a substituted or unsubstituted C2 to C30 alkenylene group, wherein at least one methylene (—$CH_2$—) is replaced with sulfonyl (—S(=O)$_2$—), carbonyl (—C(=O)—), ether (—O—), sulfide (—S—), sulfoxide (—S(=O)—), ester (—C(=O)O—), amide (—C(=O)NR—) (wherein R is hydrogen or a C1 to C10 linear or branched alkyl group), imine (—NR—) (wherein R is hydrogen or a C1 to C10 linear or branched alkyl group), or a combination thereof, n is an integer of 1 or more, k3 is an integer of 0 or 1 or more, k4 is an integer of 1 or more, provided that the sum of n and k4 is 2 or more (e.g., an integer of 3 or more), n does not exceed the valence of $Y_2$, and the sum of k3 and k4 does not exceed the valence of $L_2$.

Chemical Formula 2

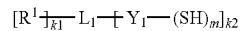

In Chemical Formula 2, $R^1$ is selected from hydrogen; a substituted or unsubstituted C1 to C30 linear or branched alkyl group; a substituted or unsubstituted C6 to C30 aryl group; a substituted or unsubstituted C3 to C30 heteroaryl group; a substituted or unsubstituted C3 to C30 cycloalkyl group; a substituted or unsubstituted C3 to C30 heterocycloalkyl group; a C1 to C10 alkoxy group; a hydroxy group; —$NH_2$; a substituted or unsubstituted C1 to C30 amine group (—NRR', wherein R and R' are independently hydrogen or a C1 to C30 linear or branched alkyl group); an isocyanate group; a halogen; —ROR' (wherein R is a substituted or unsubstituted C1 to C20 alkylene group and R' is hydrogen or a C1 to C20 linear or branched alkyl group); an acyl halide (—RC(=O)X, wherein R is a substituted or unsubstituted alkylene group and X is a halogen); —C(=O)OR' (wherein R' is hydrogen or a C1 to C20 linear or branched alkyl group); —CN; or —C(=O)ONRR' (wherein R and R' are independently hydrogen or a C1 to C20 linear or branched alkyl group), $L_1$ is carbon atom, a substituted or unsubstituted C1 to C30 alkylene group, a substituted or unsubstituted C6 to C30 cycloalkylene group, a substituted or unsubstituted C6 to C30 arylene group, or a substituted or unsubstituted C6 to C30 heteroarylene group, wherein at least one methylene (—$CH_2$—) in the substituted C1 to C30 alkylene group may be replaced with sulfonyl (—$SO_2$—), carbonyl —(C(O)—, ether (—O—), sulfide (—S—), sulfoxide (—SO—), ester (—C(=O)O—), amide (—C(=O)NR—) (wherein R is hydrogen or a C1 to C10 alkyl group), or a combination thereof, $Y_1$ is a single bond; a substituted or unsubstituted C1 to C30 alkylene group; a substituted or unsubstituted C2 to C30 alkenylene group; or a C1 to C30 alkylene group or a C2 to C30 alkenylene group, wherein at least one methylene (—$CH_2$—) may be replaced by sulfonyl (—S(=O)$_2$—), carbonyl (—C(=O)—), ether (—O—), sulfide (—S—), sulfoxide (—S(=O)—), ester (—C(=O)O—), amide (—C(=O)NR—) (wherein R is hydrogen or a C1 to C10 linear or branched alkyl group), imine (—NR—) (wherein R is hydrogen or a C1 to C10 linear or branched alkyl group), or a combination thereof, m is an integer of 1 or more, k1 is an integer of 0 or 1 or more, k2 is an integer of 1 or more, provided that the sum of m and k2 is 2 or more (e.g., an integer of 3 or more), m does not exceed the valence of $Y_1$, and the sum of k1 and k2 does not exceed the valence of $L_1$.

Chemical Formula 3

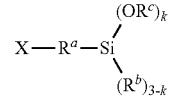

In Chemical Formula 3, $R^a$ is a C1 to C20 alkylene group, a C1 to C20 alkenylene group, a C1 to C20 alkynylene group, or a C1 to C20 arylene group, $R^b$ and $R^c$ are the same or different and are each independently a C1 to C20 aliphatic or alicyclic hydrocarbon group, X is a (meth)acrylate group, a mercapto group, or an epoxy group, and k is an integer of 1 to 3.

In development of an organic light emitting diode (OLED) or a thin film transistor (TFT), or an optical element such as an optical sheet including an optical material such as semiconductor nanocrystals, it is desired that a barrier film is formed above (e.g., on) and/or under the devices to prevent contact with moisture and oxygen. For example, a gas barrier film is manufactured by using an inorganic material such as $SiO_2$ on tens to hundreds of micrometers-thick polymer film such as PET, or PEN. Herein, a silica layer intrinsically has strong hydrophilicity, and thus may be easily delaminated from the interface when a polymer or organic material overcoating layer is formed thereon. This interlayer delamination may result in infiltration of moisture, oxygen, and the like, thus deteriorating performance of a related material, resulting in a failure to secure reliability of the material. Accordingly, a special technology for preventing the delamination between the gas barrier layer and the overcoating layer thereon is desired.

On the other hand, an attempt has been made to obtain more advantageous efficiency and color purity by using a semiconductor nanocrystal (a so-called quantum dot (QD)) as a photo-converting material (a color down-converting material) for a light emitting diode (LED) instead of a conventional phosphor. The QD has theoretical quantum efficiency of 100% and high color purity due to a possible full width at half maximum (FWHM) of less than or equal to about 40 nanometers (nm). Thus, it is expected that the QD will largely improve color reproducibility compared to a conventional inorganic phosphor when it is applied to a light emitting diode. However, since the QD has a nano-size (about 6-8 nm), while the conventional inorganic phosphor is a micron-sized particle, the QD has a short life-span. In addition, since the QD needs to secure a life-span of greater than or equal to about 30,000 hours to be practically applied to a light emitting diode, the QD still has many outstanding problems that need to be solved. One way to solve these problems is to disperse the QD in a polymer matrix such as epoxy, polyurea, or polyurethane to manufacture it as a film, and subsequently apply the film to produce an LED chip and the like. However, this polymer matrix still allows infiltration of moisture, oxygen, or the like, and therefore, the quantum dot would be susceptible to the action of moisture, oxygen, and the like. Accordingly, it is desired to protect an optical sheet, particularly, an optical sheet including the quantum dot as an optical material from the moisture and gas by using the gas barrier film.

On the other hand, an optical sheet protected by the gas barrier film may be manufactured by a method of coating a polymer matrix resin including an optical material such as the quantum dot on a lower substrate, laminating the gas barrier film on the coated polymer matrix resin, curing the polymer matrix resin including the optical material, and separating the lower substrate therefrom.

However, when the lower substrate is separated after curing the polymer matrix resin including the optical material, the polymer matrix resin including the optical material may be separated from the gas barrier film rather than the lower substrate. In other words, the polymer matrix resin including the optical material does not become bonded with the gas barrier film laminated thereon after the curing for manufacture into an optical sheet equipped with the gas barrier film, but is separated from the gas barrier film and remains on the lower substrate, while only the upper gas barrier film is separated therefrom. Herein, since the gas barrier film is adhered above (e.g., on) or under the optical sheet, the optical sheet may not be properly equipped with the gas barrier film capable of protecting the optical material from moisture and vapor.

Accordingly, the composition that includes a compound represented by Chemical Formula 3 according to an embodiment would not cause a delamination between a silica layer as the gas barrier layer and an adhesion layer coated thereon, thus providing releasing properties because the adhesion layer including an optical material does not remain on a lower substrate but is bonded with the gas barrier film, and is thus separated from the lower substrate after curing a polymer resin including the optical material during manufacture of the optical sheet.

In other words, the composition forms an adhesion layer in a gas barrier adhesive sheet, and the gas barrier adhesive sheet formed of the composition has no delamination at the interface between the adhesion layer and the gas barrier layer, for example, a silica layer. In addition, when a polymer matrix resin including an optical material is coated on the adhesion layer in the gas barrier adhesive sheet to manufacture an optical sheet, the polymer matrix resin including the optical material is separated from the lower substrate and is bonded with the adhesion layer of the gas barrier adhesive sheet.

Figure 1B:
FIG. 1B is an enlarged view of FIG. 1A.

FIG. 1A is a scanning electron microscope (SEM) photograph showing the cross-section of a gas barrier adhesive sheet manufactured by coating the composition according to an exemplary embodiment on a silica barrier layer disposed on a PEN substrate and curing the composition. FIG. 1B is an enlarged view of FIG. 1A.

As shown in FIGS. 1A and 1B, the adhesion layer is not delaminated from the silica layer in the middle but is well-adhered to the lower PEN substrate.

Figure 2:
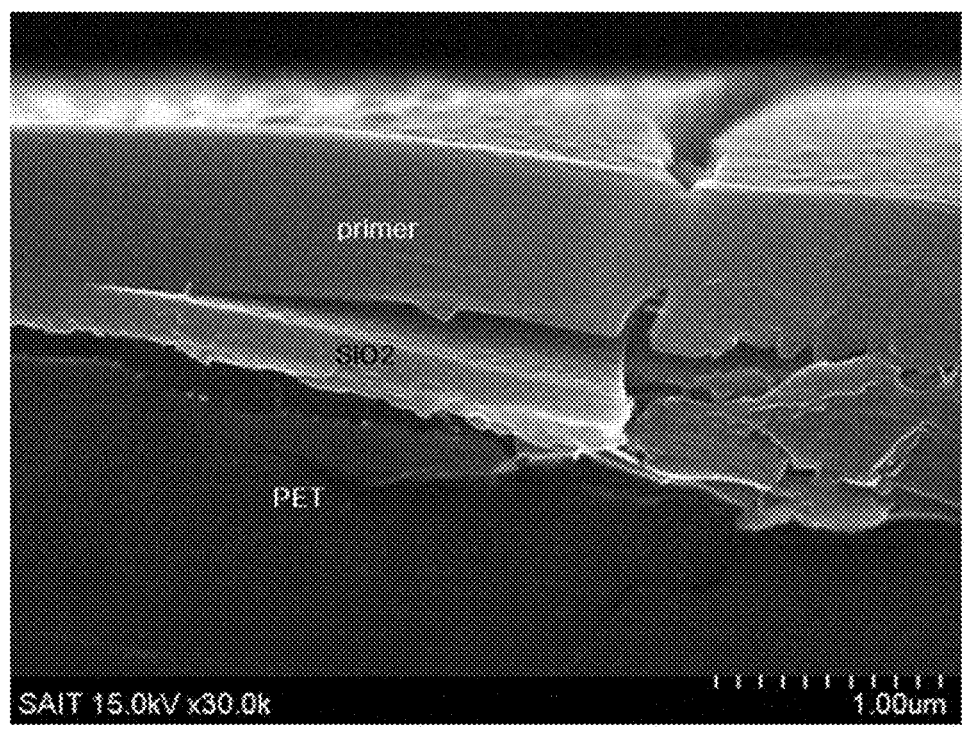
FIG. 2 is a scanning electron microscope (SEM) photograph showing a gas barrier adhesive sheet according to Comparative Example 1.

On the other hand, FIG. 2 is a photograph showing a gas barrier adhesive sheet manufactured by coating the composition on the silica gas barrier layer, and then simply drying it rather than thermally curing it. As shown in FIG. 2, the upper adhesion layer is separated from the lower PEN substrate and the silica gas barrier layer disposed on the PEN substrate. In other words, the gas barrier layer is delaminated from the adhesion layer.

In this embodiment, the composition is coated and cured on the silica barrier layer, thus providing an adhesion layer that is not delaminated from the silica barrier layer. In addition, as shown in FIG. 3, when the a gas barrier adhesive sheet is laminated and cured on a polymer matrix including semiconductor nanocrystals coated on a silicon wafer, the cured polymer matrix including the semiconductor nanocrystals is adhered to the adhesion layer of the gas barrier adhesive sheet, and thus is easily separated from the silicon wafer as a lower substrate.

Figure 3:
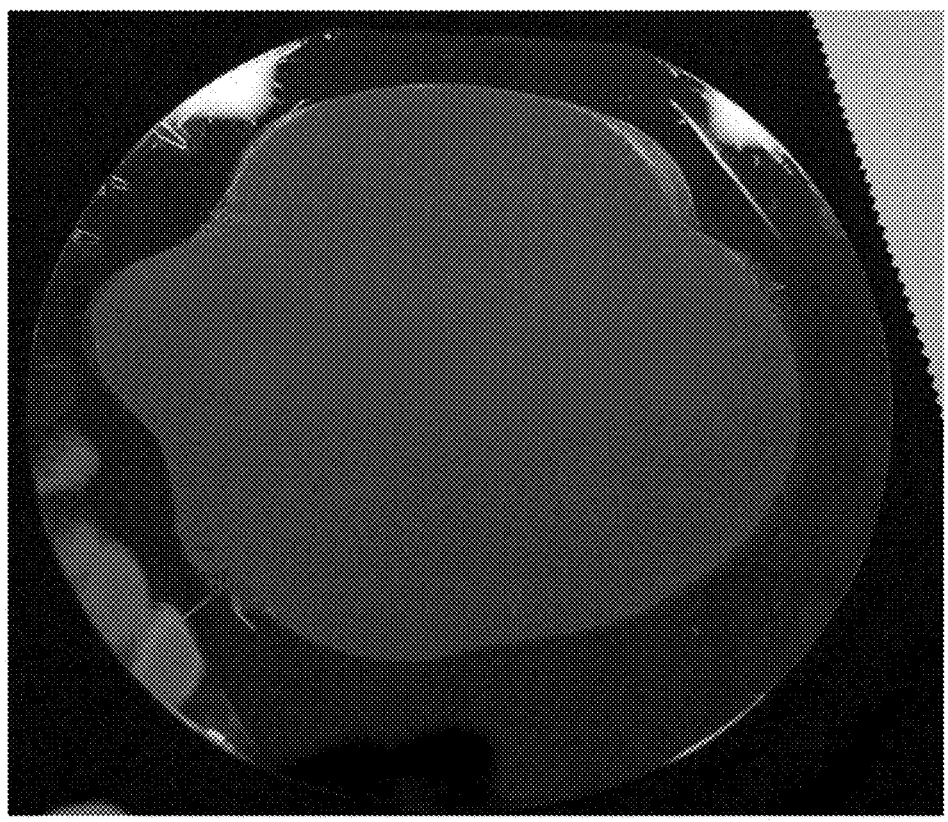
FIG. 3 is a photograph showing an optical sheet manufactured by adhering a gas barrier adhesive sheet on one surface of a QD-polymer matrix composite according to an exemplary embodiment.

FIG. 3 is a photograph showing an optical sheet manufactured by laminating the gas barrier adhesive sheet including the adhesion layer formed from the composition according to the embodiment on the polymer matrix including semiconductor nanocrystals coated on the silicon wafer, curing the polymer matrix including semiconductor nanocrystals, separating the silicon wafer, and adhering the polymer matrix including semiconductor nanocrystals to the gas barrier adhesive sheet.

Hereinafter, each component consisting of the composition is examined in detail.

The composition for an adhesion layer of a gas barrier adhesive sheet may include about 70 percent by weight (wt %) to about 99 wt % of a combination of the compound represented by Chemical Formula 1 and the compound represented by Chemical Formula 2, and about 1 wt % to about 30 wt % of the compound represented by Chemical Formula 3, based on the total weight of the composition.

In an embodiment, the composition for an adhesion layer of a gas barrier adhesive sheet may include the compound of Chemical Formula 1, the compound of Chemical Formula 2, and the compound of Chemical Formula 3.

In Chemical Formula 1, X may be selected from an acrylate group; a methacrylate group; a C2 to C30 alkenyl group; a C2 to C30 alkynyl group; a substituted or unsubstituted C3 to C30 alicyclic organic group including a carbon-carbon double bond or a carbon-carbon triple bond in the ring; a substituted or unsubstituted C3 to C30 heterocycloalkyl group including a carbon-carbon double bond or a carbon-carbon triple bond in the ring; a C3 to C30 alicyclic organic group substituted with a C2 to C30 alkenyl group or a C2 to C30 alkynyl group; or a C3 to C30 heterocycloalkyl group substituted with a C2 to C30 alkenyl group or a C2 to C30 alkynyl group.

The substituted or unsubstituted C3 to C30 alicyclic organic group including a carbon-carbon double bond or a carbon-carbon triple bond in the ring may be selected from a norbornene group, a maleimide group, a nadimide group, a tetrahydrophthalimide group, or a combination thereof.

The compound represented by Chemical Formula 1 may be a C4 to C100 diallyl compound, a C4 to C100 triallyl compound, a C4 to C100 diallyl ether compound, a C4 to C100 triallyl ether compound, a C4 to C100 di(meth)acrylate compound, a C4 to C100 tri(meth)acrylate compound, a divinyl ether compound, or a combination thereof.

In Chemical Formula 1, $L^2$ may be a group including a pyrrolidine residual group, a tetrahydrofuran residual group, a pyridine residual group, a pyrimidine residual group, a piperidine residual group, a triazine residual group or an isocyanurate residual group.

The compound represented by Chemical Formula 1 may be a compound represented by Chemical Formula 1-1, Chemical Formula 1-2, or Chemical Formula 1-3.

Chemical Formula 1-1

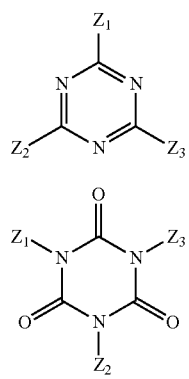

Chemical Formula 1-2

In Chemical Formulae 1-1 and 1-2, $Z_1$ to $Z_3$ independently correspond to *—$Y_2$—$(X)_n$ of Chemical Formula 1.

Chemical Formula 1-3

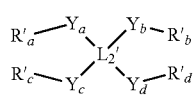

In Chemical Formula 1-3, $L_2'$ is carbon atom; a substituted or unsubstituted C1 to C30 alkylene group; a substituted or unsubstituted C2 to C30 alkenylene group; a substituted or unsubstituted C1 to C30 alkylene group, wherein at least one methylene (—$CH_2$—) is replaced with sulfonyl (—$S(=O)_2$—), carbonyl (—$C(=O)$—), ether (—O—), sulfide (—S—), sulfoxide (—$S(=O)$—), ester (—$C(=O)O$—), amide (—$C(=O)NR$—) (wherein R is hydrogen or a C1 to C10 linear or branched alkyl group), imine (—NR—) (wherein R is hydrogen or a C1 to C10 linear or branched alkyl group), a C6 to C10 cycloalkylene group, or a combination thereof; a substituted or unsubstituted C2 to C30 alkenylene group, wherein at least one methylene (—$CH_2$—) is replaced with sulfonyl (—$S(=O)_2$—), carbonyl (—$C(=O)$—), ether (—O—), sulfide (—S—), sulfoxide (—$S(=O)$—), ester (—$C(=O)O$—), amide (—$C(=O)NR$—) (wherein R is hydrogen or a C1 to C10 linear or branched alkyl group), imine (—NR—) (wherein R is hydrogen or a C1 to C10 linear or branched alkyl group), a C6 to C10 cycloalkylene group, or a combination thereof; a substituted or unsubstituted C6 to C30 arylene group; a substituted or unsubstituted C3 to C30 heteroarylene group; a substituted or unsubstituted C3 to C30 cycloalkylene group; or a substituted or unsubstituted C3 to C30 heterocycloalkylene group, $Y_a$ to $Y_d$ are independently a single bond; a substituted or unsubstituted C1 to C30 alkylene group; a substituted or unsubstituted C2 to C30 alkenylene group; or a substituted or unsubstituted C1 to C30 alkylene group or a substituted or unsubstituted C2 to C30 alkenylene group, wherein at least one methylene (—$CH_2$—) is replaced with sulfonyl (—$S(=O)_2$—), carbonyl (—$C(=O)$—), ether (—O—), sulfide (—S—), sulfoxide (—$S(=O)$—), ester (—$C(=O)$ O—), amide (—$C(=O)NR$—) (wherein R is hydrogen or a C1 to C10 linear or branched alkyl group), imine (—NR—) (wherein R is hydrogen or a C1 to C10 linear or branched alkyl group), or a combination thereof, and $R'_a$ to $R'_d$ are $R^2$ or X of Chemical Formula 1, provided that at least one (e.g., 2 or more) of $R'_a$ to $R'_d$ is X of Chemical Formula 1.

The compound represented by Chemical Formula 1 may include a compound represented by Chemical Formula 1-4, a compound represented by Chemical Formula 1-5, a compound represented by Chemical Formula 1-6, a compound represented by Chemical Formula 1-7, a compound represented by Chemical Formula 1-8, a compound represented by Chemical Formula 1-9, a compound represented by Chemical Formula 1-10, a compound represented by Chemical Formula 1-11, or a combination thereof.

Chemical Formula 1-4

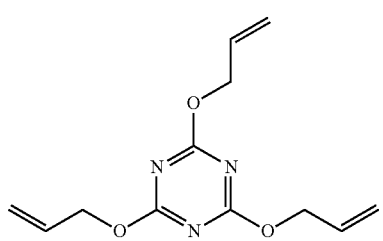

Chemical Formula 1-5

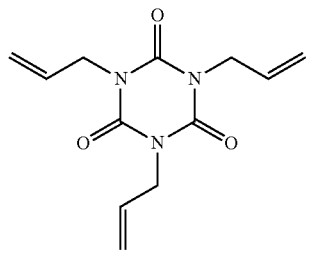

Chemical Formula 1-6

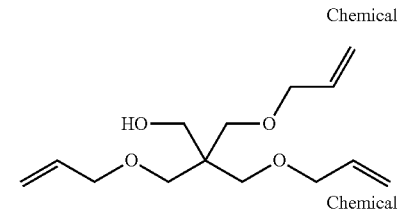

Chemical Formula 1-7

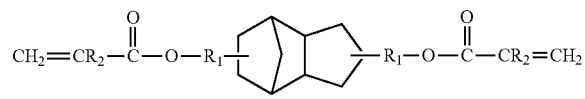

In Chemical Formula 1-7, each $R_1$ is independently a substituted or unsubstituted C1 to C20 alkylene group, wherein at least one methylene (—$CH_2$—) may be replaced with sulfonyl (—S(=O)$_2$—), carbonyl (—C(=O)—), ether (—O—), sulfide (—S—), sulfoxide (—S(=O)—), ester (—C(=O)O—), amide (—C(=O)NR—) (wherein R is hydrogen or a C1 to C10 linear or branched alkyl group), imine (—NR—) (wherein R is hydrogen or a C1 to C10 linear or branched alkyl group), or a combination thereof, and each $R_2$ is independently hydrogen or a methyl group.

Chemical Formula 1-8

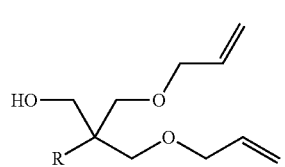

In Chemical Formula 1-8, R is a C1 to C10 alkyl group.

Chemical Formula 1-9

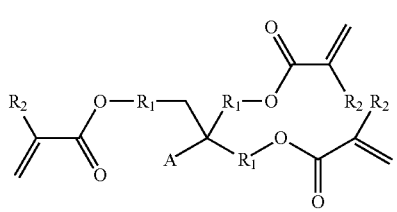

In Chemical Formula 1-9,

A is a C1 to C10 alkyl group or a hydroxy group, each $R_1$ is the same or different and is independently a single bond, a C1 to C20 alkylene group, a substituted C1 to C20 alkylene group, wherein at least one methylene (—$CH_2$—) may be replaced by sulfonyl (—S(=O)$_2$—), carbonyl (—C(=O)—), ether (—O—), sulfide (—S—), sulfoxide (—S(=O)—), ester (—C(=O)O—), amide (—C(=O)NR—) (wherein R is hydrogen or a C1 to C10 linear or branched alkyl group), imine (—NR—) (wherein R is hydrogen or a C1 to C10 linear or branched alkyl group), or a combination thereof, and each $R_2$ is independently hydrogen or a methyl group.

Chemical Formula 1-10

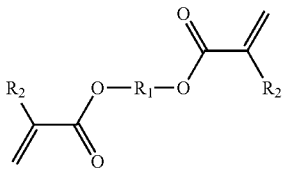

In Chemical Formula 1-10, $R_1$ is a single bond, a C1 to C20 alkylene, or a substituted C1 to C20 alkylene group, wherein at least one methylene (—$CH_2$—) may be replaced with sulfonyl (—S(=O)$_2$—), carbonyl (—C(=O)—), ether (—O—), sulfide (—S—), sulfoxide (—S(=O)—), ester (—C(=O)O—), amide (—C(=O)NR—) (wherein R is hydrogen or a C1 to C10 linear or branched alkyl group), imine (—NR—) (wherein R is hydrogen or a C1 to C10 linear or branched alkyl group), or a combination thereof, and $R_2$ is independently hydrogen or a methyl group.

Chemical Formula 1-11

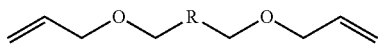

In Chemical Formula 1-11, R is a single bond, a C1 to C20 alkylene, or a substituted C1 to C20 alkylene group, wherein at least one methylene (—$CH_2$—) may be replaced with sulfonyl (—S(=O)$_2$—), carbonyl (—C(=O)—), ether (—O—), sulfide (—S—), sulfoxide (—S(=O)—), ester (—C(=O)O—), amide (—C(=O)NR'—) (wherein R' is hydrogen or a C1 to C10 linear or branched alkyl group), imine (—NR'—) (wherein R' is hydrogen or a C1 to C10 linear or branched alkyl group), or a combination thereof.

Chemical Formula 1-12

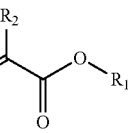

In Chemical Formula 1-12, $R_1$ is a C4 to C20 linear or branched alkyl group, and $R_2$ is hydrogen or a methyl group.

The compound of Chemical Formula 1 has at least one carbon-carbon unsaturated bond (e.g., a carbon-carbon double bond such as a (meth)acrylate group or a vinyl group) at the terminal end. The compound may form a polymer by a radical polymerization reaction during photo-irradiation after coating the composition due to the presence of the carbon-carbon unsaturated bond (e.g., a (meth)acrylate group, a vinyl group, and the like) at the terminal end.

The compound of Chemical Formula 2 may include a compound of Chemical Formula 2-1.

Chemical Formula 2-1

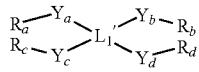

In Chemical Formula 2-1, $L_1'$ is carbon atom, a substituted or unsubstituted C6 to C30 arylene group; a substituted or unsubstituted C3 to C30 heteroarylene group; a substituted or unsubstituted C3 to C30 cycloalkylene group; or a substituted or unsubstituted C3 to C30 heterocycloalkylene group, $Y_a$ to $Y_d$ are independently a single bond; a substituted or unsubstituted C1 to C30 alkylene group; a substituted or unsubstituted C2 to C30 alkenylene group; or a substituted or unsubstituted C1 to C30 alkylene group or a substituted or unsubstituted C2 to C30 alkenylene group, wherein at least one methylene (—CH$_2$—) is replaced with sulfonyl (—S(=O)$_2$—), carbonyl (—C(=O)—), ether (—O—), sulfide (—S—), sulfoxide (—S(=O)—), ester (—C(=O)O—), amide (—C(=O)NR—) (wherein R is hydrogen or a C1 to C10 linear or branched alkyl group), imine (—NR—) (wherein R is hydrogen or a C1 to C10 linear or branched alkyl group), or a combination thereof, and $R_a$ to $R_d$ are $R^1$ or SH of Chemical Formula 2, provided that at least one (e.g., 2 or more) of $R_a$ to $R_d$ is SH.

The compound of Chemical Formula 2 may be trimethylolpropane tris(3-mercaptopropionate) represented by Chemical Formula 2-2, pentaerythritol tetrakis(3-mercaptopropionate) represented by Chemical Formula 2-3, pentaerythritol tetrakis(2-mercaptoacetate) represented by Chemical Formula 2-4, tris[2-(3-mercaptopropinonyloxy)alkyl]isocyanurate represented by Chemical Formula 2-5, a compound represented by Chemical Formula 2-6, or a combination thereof.

Chemical Formula 2-2

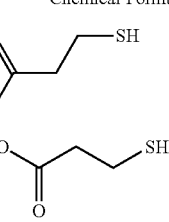

Chemical Formula 2-3

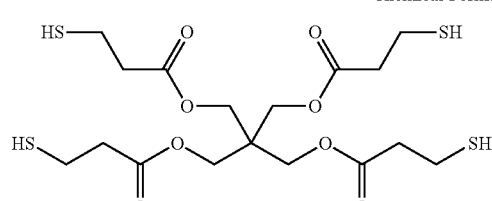

Chemical Formula 2-4

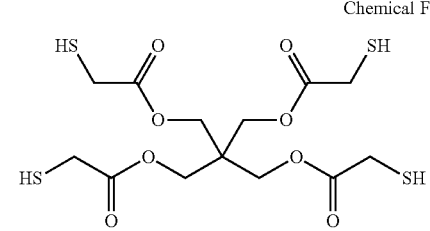

Chemical Formula 2-5

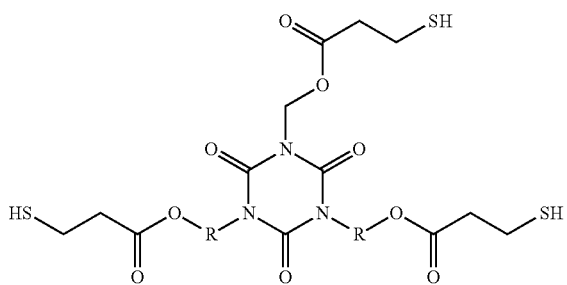

In Chemical Formula 2-5, R is a substituted or unsubstituted C1 to C10 alkylene.

Chemical Formula 2-6

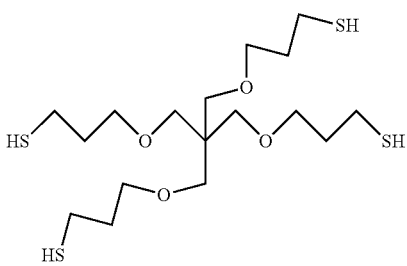

The compound of Chemical Formula 2 includes at least one mercapto group at the terminal end. The compound including a mercapto group may participate in radical polymerization when a composition including the compound is coated and photo-irradiated.

The compound of Chemical Formula 1 and the compound of Chemical Formula 2 may be photopolymerized into a polymer when irradiated by light.

The compound represented by Chemical Formula 3 has at least one alkoxy group at one terminal end, and thus may be bonded with silica when heat-treated.

The compound represented by Chemical Formula 3 includes a functional group such as a (meth)acrylate group, a mercapto group, an epoxy group, and the like at the other terminal end, and may be photopolymerized when the functional group is irradiated by light.

Accordingly, the compound represented by Chemical Formula 3 is bonded with the silica layer as a gas barrier layer through a heat treatment, and in addition, may be photopolymerized with another compound represented by Chemical Formula 3 and with the compounds represented by Chemical Formula 1 and/or 2 through photo-irradiation.

The compound represented by Chemical Formula 3 may be, for example, N-mercaptopropyltrimethoxysilane or 3-(trimethoxysilyl)propylmethacrylate, but is not limited thereto.

The composition includes the compound of Chemical Formula 1 and the compound of Chemical Formula 2, and optionally, the compound represented by Chemical Formula 3, and may provide an adhesion layer having excellent adherence to both a silica layer of an inorganic material layer and an optical material layer including an optical material such as a quantum dot and the like.

In another embodiment, a gas barrier adhesive sheet includes a gas barrier layer and an adhesion layer manufactured from the composition according to the embodiment thereon.

For example, the adhesion layer may be formed by coating the composition on the gas barrier layer and curing the composition.

As mentioned above, since each of the compounds represented by Chemical Formulae 1 and 2 in the composition includes a photocurable functional group at the terminal end, the composition may be coated on the gas barrier layer and primarily cured through photo-irradiation. Selectively, the composition may be thermally cured (i.e., heat-treated), and since the compound represented by Chemical Formula 3 in the composition includes a terminal end capable of bonding with an inorganic material such as silica and the like and is chemically bonded with the inorganic material such as silica, the adhesion layer formed from the composition may be strongly adhered to the gas barrier layer.

The photo-irradiation may be performed by UV irradiation and the like. Thus, the composition may additionally include a photoinitiator. The photoinitiator may include a well-known photoinitiator, such as Irgacure 184, Irgacure 754, or Irgacure 819, but is not limited thereto. The photoinitiator may be included in an amount of about 0.1 wt % to about 10 wt % based on the weight of the entire composition.

The heat treatment may be performed at about 120° C. to about 180° C. for about 5 minutes to about 30 minutes. The heat treatment may additionally improve adherence. For example, the adherence between the silica layer and the adhesion layer may become much stronger and more effectively prevent the interface delamination.

In addition, the heat treatment may prevent an optical material layer coated on a lower substrate and cured between the gas barrier film and the lower substrate from being disposed on the lower substrate after the curing. However, the optical material layer may be adhered to the adhesion layer and separated toward the gas barrier film.

On the other hand, the gas barrier adhesive sheet may be formed by the method of coating and curing the composition on the gas barrier. In another method, only the compound represented by Chemical Formula 3 may be coated and cured through a primary surface treatment. Then, an additional coating of the compounds represented by Chemical Formulae 1 and 2 may be performed on the primarily surface-treated gas barrier layer. The latter method does not essentially differ from the former method. In other words, since one terminal end of the compound represented by Chemical Formula 3 is bonded with an inorganic material such as silica, while its other end is photopolymerized with a photocurable functional group included in at least one of the compounds represented by Chemical Formulae 1 and 2, the obtained adhesion layer shows an improved close-contacting force on the interface with the gas barrier layer and is not delaminated from the gas barrier layer.

The coating method of the composition on the gas barrier layer may be performed by a variety of well-known methods in a related art. For example, the coating may include spin coating or coating by using a bar coater or a slot-die coater, but is not limited thereto.

In the gas barrier adhesive sheet, the gas barrier layer may include silica ($SiO_2$). However, without limitation, the gas barrier layer may include another metal oxide such as titania ($TiO_2$), zirconia ($ZrO_2$), zinc oxide ($ZnO_2$), alumina ($Al_2O_3$), or indium tin oxide (ITO), depending on the use.

Figure 7:
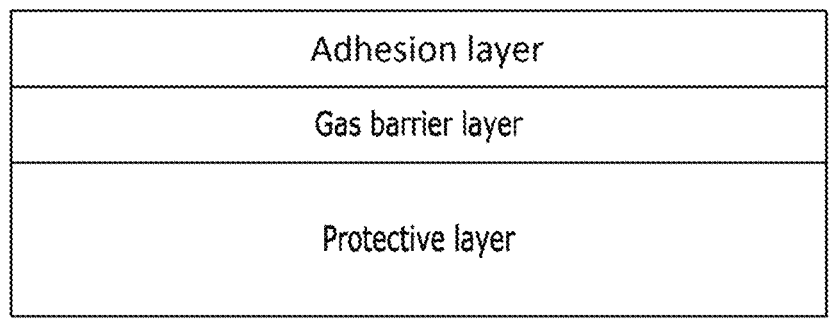
FIG. 7 is a schematic representation of the gas barrier adhesive sheet according to an embodiment, which includes a gas barrier layer, an adhesion layer disposed on one side of the gas barrier layer, and a protective layer disposed on the other side of the gas barrier layer.

The gas barrier adhesive sheet may further include a protective layer disposed on the side, which is opposite to the side on which the adhesion layer is formed (FIG. 7).

The protective layer may include polyethyleneterephthalate (PET), polyethylenesulfone (PES), or polyethylenenaphthalate (PEN).

In another embodiment, an optical sheet including the gas barrier adhesive sheet according to the embodiment is provided.

The optical sheet may include a semiconductor nanocrystal in a polymer matrix.

The semiconductor nanocrystal may be selected from a Group II-VI compound semiconductor nanocrystal, a Group III-V compound semiconductor nanocrystal, a Group IV-VI compound semiconductor nanocrystal, and a Group VI compound semiconductor nanocrystal.

The Group II-VI compound may be selected from:

a binary element compound selected from CdSe, CdTe, ZnS, ZnSe, ZnTe, ZnO, HgS, HgSe, HgTe, MgSe, MgS, and a combination thereof;

a ternary element compound selected from CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, MgZnSe, MgZnS, and a combination thereof; and a quaternary element compound selected from HgZnTeS, CdZnSeS, CdZnSeTe, CdZnSTe, CdHgSeS, CdHgSeTe, CdHgSTe, HgZnSeS, HgZnSeTe, HgZnSTe, and a combination thereof.

The Group III-V compound may be selected from:

a binary element compound selected from GaN, GaP, GaAs, GaSb, AlN, AlP, AlAs, AlSb, InN, InP, InAs, InSb, and a combination thereof;

a ternary element compound selected from GaNP, GaNAs, GaNSb, GaPAs, GaPSb, AlNP, AlNAs, AlNSb, AlPAs, AlPSb, InNP, InNAs, InNSb, InPAs, InPSb, GaAlNP, and a combination thereof; and a quaternary element compound selected from GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs, InAlPSb, and a combination thereof.

The Group IV-VI compound may be selected from:

a binary element compound selected from SnS, SnSe, SnTe, PbS, PbSe, PbTe, and a combination thereof;

a ternary element compound selected from SnSeS, SnSeTe, SnSTe, PbSeS, PbSeTe, PbSTe, SnPbS, SnPbSe, SnPbTe, and a combination thereof; and a quaternary element compound selected from SnPbSSe, SnPbSeTe, SnPbSTe, and a combination thereof.

The Group IV compound may be selected from:

a single-element compound selected from Si, Ge, and a combination thereof; and a binary element compound selected from SiC, SiGe, and a combination thereof.

The binary element compound, the ternary element compound or the quaternary element compound are respectively present in a uniform concentration in the semiconductor nanocrystal particle or partially different concentrations in the same particle. In addition, the semiconductor nanocrystal may have a core/shell structure in which one semiconductor nanocrystal surrounds another semiconductor nanocrystal. Herein, the elements in the shell may have a concentration gradient such that their concentration becomes gradually lower in the interface of the shell with the core. In addition, the semiconductor nanocrystal may have a structure including a semiconductor nanocrystal core and a multi-layer shell surrounding the same. The multi-layer shell may have a two or more layered shell structure. Each layer may have a uniform composition or may be an alloy or may have a concentration gradient.

In addition, the semiconductor nanocrystal may have a structure effectively showing the quantum confinement effect since the material composition for the shell has a higher energy band gap than that of the core. In case of a multi-layered shell, the energy band gap of the shell disposed on the exterior of the core is higher than the energy gap of any shell located closer to the core. The semiconductor nanocrystal may have an ultraviolet (UV) to infrared wavelength range.

The semiconductor nanocrystal may have quantum efficiency of greater than or equal to about 10%, greater than or equal to about 30%, for example, greater than or equal to about 50%, greater than or equal to about 60%, greater than or equal to about 70%, or greater than or equal to about 90%.

In addition, the full width of half maximum (FWHM) of the light emitting wavelength spectrum of the semiconductor nanocrystal may be designed to be narrower or wider depending on the application field. It may have a narrower spectrum in order to improve the color purity or the color reproducibility in a display. The semiconductor nanocrystal may have the FWHM of the light emitting wavelength spectrum of less than or equal to about 45 nm, for example, less than or equal to about 40 nm, or less than or equal to about 30 nm. Within the above ranges, color purity or color reproducibility of a device may be improved.

The nanocrystal may have a particle diameter (an average largest particle diameter for non-spherical shape) of about 1 nm to about 100 nm. For example, the nanocrystal may have a particle diameter (an average largest particle diameter of a non-spherical shape) of about 1 nm to about 10 nm.

The nanocrystal may have a shape generally-used in this art, so the shape of the nanocrystal is not particularly limited. For example, the nanocrystal may have spherical, pyramidal, multi-armed, or cubic nanoparticles, nanotubes, nanowires, nanofibers, nanoplate particles, or the like.

The nanocrystal may be synthesized according to any synthesis method known in this art. For example, it may be synthesized according to the following method.

In non-limiting examples, several nano-sized semiconductor nanocrystals may be synthesized by a wet chemical process. In the wet chemical process, precursor materials react to grow crystal particles in an organic solvent, and the organic solvent or the ligand compound is naturally coordinated on the surface of the semiconductor nanocrystal to control growth of the crystal. The organic solvent coordinated on the surface of the nanocrystal may affect stability of a device, and thus excessive organic material that is not coordinated on the surface of the nanocrystal may be removed by washing with excess of a non-solvent, and centrifuging the resultant mixture. Examples of the non-solvent may be acetone, ethanol, methanol, and the like, but are not limited thereto. After removing the excessive organic material, the amount of the organic material coordinated on the surface of the nanocrystal may be less than or equal to about 35 wt % of the total nanocrystal weight. Such an organic material may be a ligand compound, an organic solvent, or a combination thereof. The ligand compound is not particularly limited, and may be any organic compound that is used as a ligand compound in a wet chemical process. For example, the ligand compound may include RCOOH, $RNH_2$, $R_2NH$, $R_3N$, RSH, $R_3PO$, $R_3P$, ROH, RCOOR', $RPO(OH)_2$, $R_2POOH$ (wherein R and R' are independently a C1 to C24 alkyl group or a C5 to C20 aryl group), or a combination thereof. The organic ligand compound coordinates to the surface of the prepared nanocrystal, makes the nanocrystal better dispersed in a solution, and improves light emitting and electrical characteristics. Specific examples of the organic ligand compound may be methanethiol, ethanethiol, propanethiol, butanethiol, pentanethiol, hexanethiol, octanethiol, dodecanethiol, hexadecanethiol, octadecanethiol, benzenethiol; methaneamine, ethaneamine, propaneamine, butaneamine, pentaneamine, hexaneamine, octaneamine, dodecaneamine, hexadecylamine, octadecylamine, dimethylamine, diethylamine, dipropylamine, methanoic acid, ethanoic acid, propanoic acid, butanoic acid, pentanoic acid, hexanoic acid, heptanoic acid, octanoic acid, dodecanoic acid, hexadecanoic acid, octadecanoic acid, oleic acid, benzoic acid, a phosphine such as methylphosphine, ethylphosphine, propylphosphine, butylphosphine, or pentylphosphine, a phosphine compound or an oxide compound thereof such as methylphosphine oxide, ethylphosphine oxide, propylphosphine oxide, or butylphosphine oxide, diphenylphosphine, a triphenylphosphine compound or an oxide compound thereof, phosphonic acid, and the like, but are not limited thereof. The organic ligand compound may be used as a single compound or as a mixture of two or more compounds. The solvent is not particularly limited, and may be any compound that may be used as a solvent in a wet chemical process. For example, the solvent may be selected from C6 to C22 primary alkyl amines such as hexadecylamine; C6 to C22 secondary alkylamines such as dioctylamine; C6 to C40 tertiary alkylamines such as trioctylamine; nitrogen-containing heterocyclic compounds such as pyridine; C6 to C40 aliphatic hydrocarbons (e.g., alkane, alkene, alkyne, and the like) such as hexadecane, octadecane, octadecene, or squalane; C6 to C30 aromatic hydrocarbons such as phenyldodecane, phenyltetradecane, or phenylhexadecane; phosphines substituted with a C6 to C22 alkyl group trioctylphosphine and the like; phosphine oxides substituted with a C6 to C22 alkyl group such as trioctylphosphine oxide; and C12 to C22 aromatic ethers such as phenyl ether, benzyl ether, and a combination thereof, but is not limited thereto.

The polymer matrix may include poly(meth)acrylate, epoxy, polyurea, or polyurethane.

Alternatively, the polymer matrix may be prepared by further adding components constituting a composition for the adhesion layer of the gas barrier adhesive sheet to the matrix resin. For example, the components constituting a composition may be at least one compound selected from the compound represented by Chemical Formula 1 and at least one compound selected from the compound represented by Chemical Formula 2.

In another embodiment, an optical device including the optical sheet according to the embodiment is provided.

The optical device may be a backlight unit (BLU) or a liquid crystal display (LCD).

The optical sheet may be used as a photo converting material (color down-converting material) of a light emitting diode.

Hereinafter, the embodiments will be described in detail with reference to examples. However, these embodiments are only exemplified here and the present disclosure is not limited thereto.

EXAMPLES

Examples 1 to 8: Manufacture of Gas Barrier Adhesive Sheet

A-DCP (tricyclodecane dimethanol diacrylate), 4T (pentaerythritol tetrakis(3-mercaptopropionate)) and MPTMS (N-mercaptopropyltrimethoxysilane) are respectively mixed in a weight ratio of 60:30:10, and the mixture is mixed with toluene in a weight ratio of 1:1. The resulting mixture is spin-coated at a speed of about 1,000 revolutions per minute (rpm) for about 1 minute on an about 10 micrometers (μm)-thick silica layer coated on an about 10 μm-thick polyethylenenaphthalate (PEN) substrate. After the spin-coating, the coated resultant is dried at room temperature to less than or equal to 100° C. for 30 minutes. Then, the dried resultant is exposed through a UV ray (254 nm and 356 nm) exposer for about 30 seconds and cured. The cured resultant is thermally cured at about 120° C. in a vacuum oven for 10 minutes, manufacturing a gas barrier adhesive sheet having an about 9 μm-thick adhesion layer according to Example 1.

On the other hand, thickness of the adhesion layer may be adjusted by controlling the speed and time of the spin-coating. In other words, the adhesion layer may be about 19 μm thick by performing the spin-coating at 500 rpm for 1 minute, or about 3 μm thick by performing the spin-coating at 3,000 rpm for 1 minute.

In addition, each gas barrier adhesive sheet according to Examples 2 to 8 is manufactured according to the same method as Example 1 by using a composition including the components provided in the following Table 1. Herein, each composition may be coated regardless of being diluted or not in an organic solvent such as toluene depending on viscosity by using a bar coater or a slot-die coater other than the spin-coating.

In the following Table 1, the unabbreviated name of each component is as follows.

4T: pentaerythritol tetrakis(3-mercaptopropionate)
TMPTA: trimethylolpropane triacrylate
A-DCP: tricyclodecane dimethanol diacrylate
HDDA: 1,6-hexanediol diacrylate
HDEDA: 1,6-hexanediol ethoxylate diacrylate
EGDMA: ethylene glycol dimethacrylate
LMA: lauryl methacrylate
MPTMS: N-mercaptopropyltrimethoxysilane
TMSPM: 3-(trimethoxysilyl)propyl methacrylate
TTT: 1,3,5-triallyl-1,3,5-triazine-2,4,6(1H,3H,5H)-trione

TABLE 1

| | Material composition for forming adhesion layer (wt %) |
|---|---|
| Example 1 | A-DCP/4T/MPTMS(60/30/10) |
| Example 2 | A-DCP/HDDA/MPTMS(45/35/20) |
| Example 3 | A-DCP/HDDA/TMPTA/MPTMS(45/35/10/10) |
| Example 4 | A-DCP/4T/HDDA/MPTMS(50/30/10/10) |
| Example 5 | A-DCP/TMPTA/4T/MPTMS(50/20/20/10) |
| Example 6 | A-DCP/TMPTA/4T/TMSPM(50/30/10/10) |
| Example 7 | A-DCP/TMPTA/4T/TMSPM(50/10/20/20) |
| Example 8 | 4T/TTT/TMSPM(55/35/10) |

Comparative Example 1: Manufacture of Gas Barrier Adhesive Sheet Including Adhesion Layer Having Different Composition I In order to manufacture an optical sheet, methyl methacrylate and toluene are maintained in a weight ratio of 50:50%, and about 3 wt % of Irgacure 754 as a photoinitiator is added thereto to prepare a composition. The composition is used according to the same method as Example 1, manufacturing a gas barrier adhesive sheet. The cross-section of the sheet is shown in FIG. 2. Referring to FIG. 2, the sheet is insufficiently adhered to $SiO_2$.

Comparative Example 2: Manufacture of Gas Barrier Adhesive Sheet Including Adhesion Layer Having Different Composition II In order to manufacture an optical sheet, methyl methacrylate and MPTMS are maintained in a weight ratio of 90:10%, the solution is mixed with toluene in a weight ratio of 50:50%, and about 3 wt % of Irgacure 754 as a photoinitiator is added thereto to prepare a composition. The composition is used according to the same method as Example 1, manufacturing a gas barrier adhesive sheet. The manufactured adhesion layer shows insufficient adhesion to silica.

Comparative Example 3: Manufacture of Gas Barrier Adhesive Sheet Including Adhesion Layer Having Different Composition III A gas barrier adhesive sheet is manufactured according to the same method as described in Example 1, except for using no MPTMS (i.e., a composition of A-DCP/4T/MPTMS(60/40/0)).

Example 9: Manufacture of Optical Sheet Having Gas Barrier Adhesive Sheet on Both Sides In order to manufacture an optical sheet, when A-DCP, 4T and an LMA (lauryl methacrylate) monomers are respectively mixed in a ratio of 60 wt %, 30 wt %, and 10 wt %, 5 wt % of a semiconductor nanocrystal (CdZnSe:S) is primarily dispersed into the mixture based on the weight of the LMA monomer, the solution is maintained to be 10% when entirely mixed with the A-DCP and the 4T, and about 3 wt % of Irgacure 754 as a photoinitiator is added thereto.

The resulting mixture is coated to be about 10 μm thick on the adhesion layer of the gas barrier adhesive sheet according to Example 1. The gas barrier adhesive sheet according to Example 1 is laminated on the coated QD-polymer matrix coating layer with the adhesion layer contact with the coating layer. Then, the QD-polymer matrix layer is photocured through exposure at about 100 milliJoules per square centimeter ($mJ/cm^2$) to 5,000 $mJ/cm^2$ (e.g., 500 $mJ/cm^2$) for about 10 seconds by using a UV ray (254 nm and 356 nm) exposer.

Figure 4:
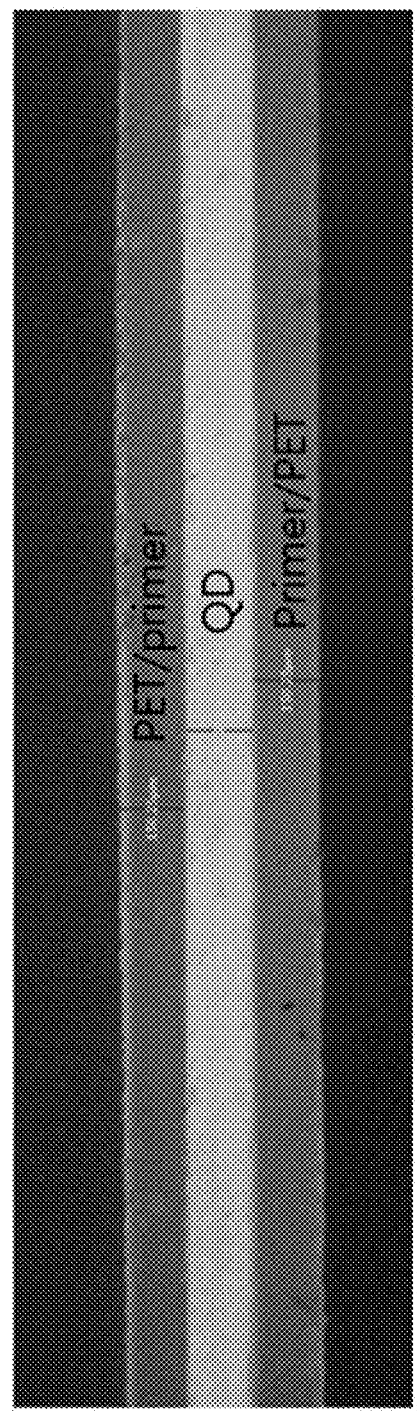
FIG. 4 is a scanning electron microscope (SEM) photograph showing the cross-section of an optical sheet manufactured by adhering a gas barrier adhesive sheet on both surfaces of a QD-polymer matrix composite according to an exemplary embodiment.

FIG. 4 provides an optical microscope image showing the cross-section of the optical sheet. Referring to FIG. 4, the adhesion layer and the barrier in the gas barrier adhesive sheet laminated on both sides of the QD-optical sheet are not separated from each other, and in addition, the QD-polymer matrix layer and the gas barrier adhesive sheets (PET/primer) on both sides thereof are well-adhered without delamination.

Example 10: Manufacture of Optical Sheet Having Gas Barrier Adhesive Sheet on One Side An optical sheet is manufactured by adhering the same QD-polymer matrix solution as that of Example 9 to the gas barrier adhesive sheet according to Example 5.

Specifically, the QD-polymer matrix solution is coated to be about 100 μm thick on a silicon wafer as a lower substrate, and an adhesion layer of the gas barrier adhesive sheet according to Example 5 is laminated thereon. Then, the QD-polymer matrix layer is photocured through exposure at about 100 $mj/cm^2$ to 5,000 $mj/cm^2$ (e.g., 500 $mJ/cm^2$) for about 10 seconds by using a UV ray (254 nm and 356 nm) exposer.

After the photocuring, when the lower silicon wafer is separated from the QD-polymer matrix layer, the QD-polymer matrix layer is bonded with the gas barrier adhesive sheet, manufacturing a QD-containing optical sheet having the gas barrier adhesive sheet as shown in FIG. 3. Accordingly, when the gas barrier adhesive sheet according to the embodiment is used, a QD-containing optical material does not remain on the lower substrate after the curing but moves to the gas barrier adhesive sheet and is separated.

Evaluation

Whether the silica layer and the adhesion layer of the gas barrier film according to Example 1 are delaminated or not after the photocuring, is examined through an SEM image. As shown in FIGS. 1A and 1B, the gas barrier adhesive sheet according to Example 1 shows no delamination between the silica layer and the adhesion layer on the PET or PEN substrate.

Figure 5:
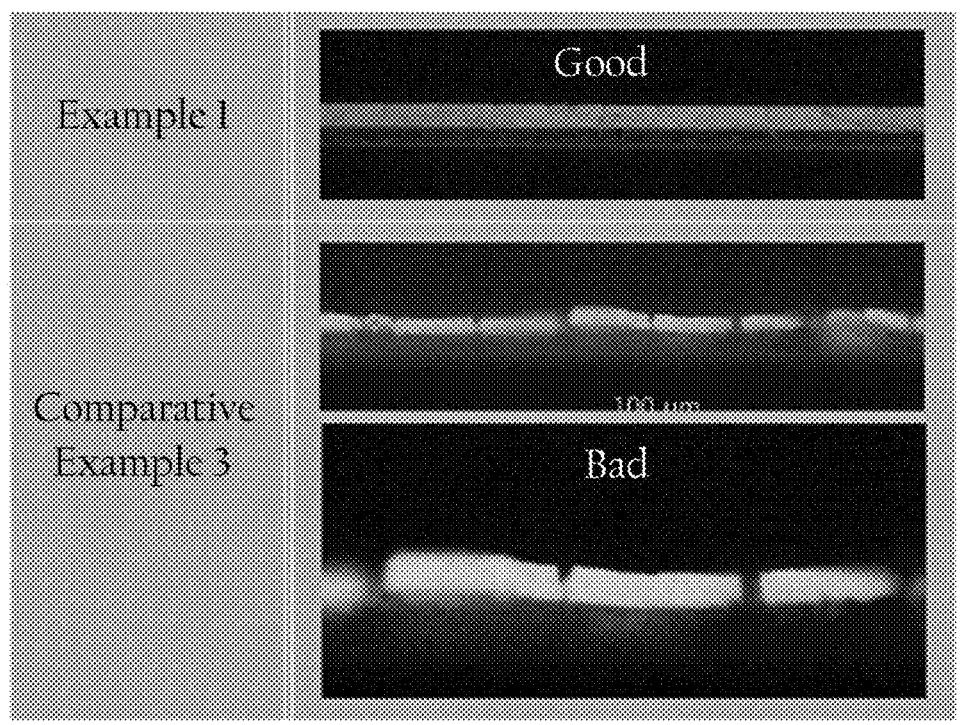
FIG. 5 is a cross-section photograph showing whether a pattern is maintained or not by attaching a 3M tape to the pattern and removing the tape after forming the pattern by using a cross hatch cutter on each adhesion layer of the gas barrier adhesive sheets according to Example 1 and Comparative Example 3.
Figure 6:
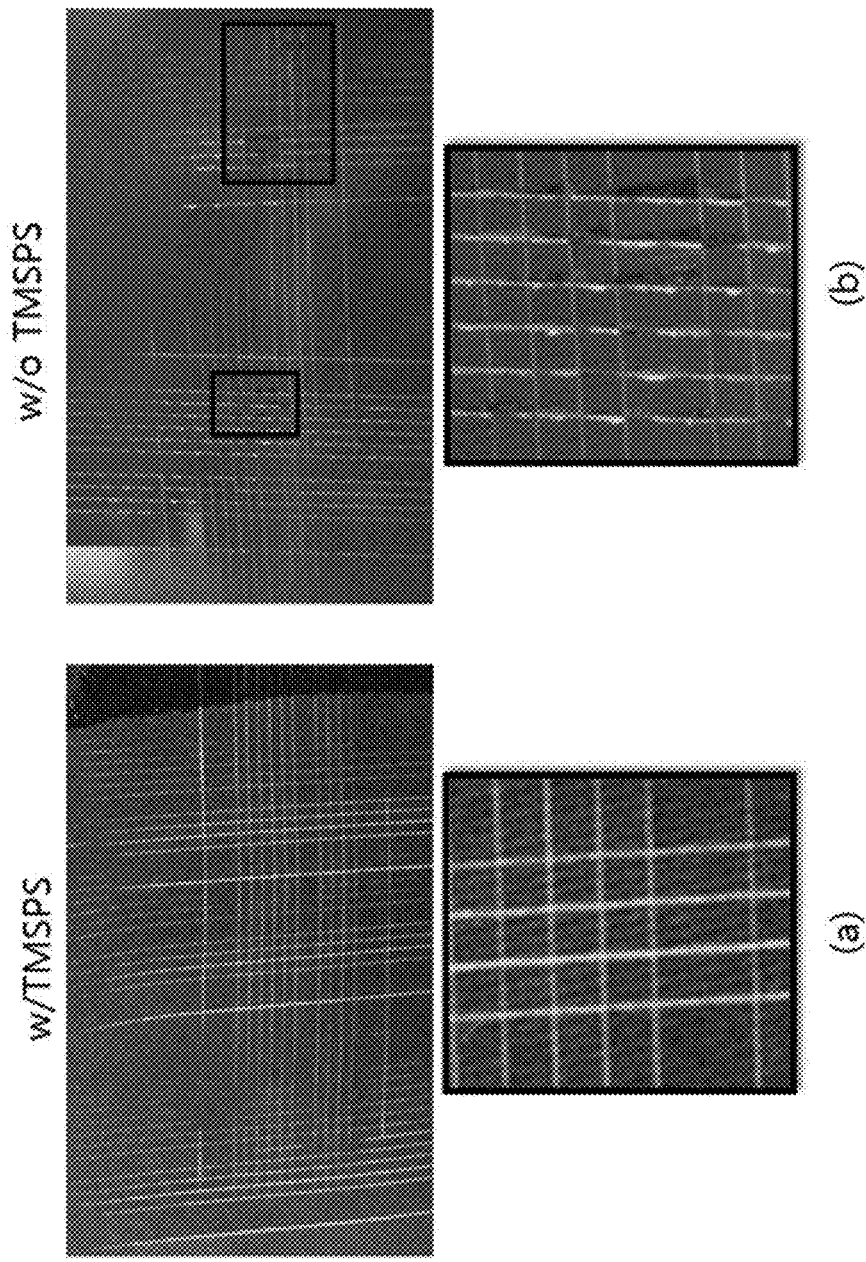
FIG. 6 is a photograph showing whether a pattern is maintained (a) or not (b) by attaching a 3M tape to the pattern and removing the tape after forming the pattern by using a cross hatch cutter on each adhesion layer on the gas barrier adhesive sheets according to Example 1 (a) and Comparative Example 3 (b), and thus showing adhesion strength between the barrier layer and the adhesion layer in each gas barrier adhesive sheet.

On the other hand, adherence between the adhesion layer and the barrier layer of each gas barrier adhesive sheet according to Example 1 and Comparative Example 3 is compared by respectively forming a pattern on the surface of the adhesion layer with across hatch cutter, and then attaching a 3M tape thereto and removing the tape. FIG. 6 is a photograph showing the gas barrier adhesive sheet according to Example 1 (a), and the gas barrier adhesive sheet according to Comparative Example 1 (b). FIG. 5 shows the cross-sections of the adhesive sheets according to Example 1 and Comparative Example 3.

As shown in FIG. 6 and FIG. 5, a gas barrier adhesive sheet manufactured by curing a composition according to the embodiment shows excellent adherence between a barrier layer and an adhesion layer in the sheet, and maintains a pattern since a resin forming the adhesion layer is not detached therefrom. On the other hand, a gas barrier adhesive sheet manufactured by using a composition according to Comparative Example 3 shows weak adherence between a barrier layer and an adhesion layer in the sheet, and thus a resin forming the adhesion layer is detached therefrom when a 3M tape is attached thereto and removed.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An optical sheet including a single optical material layer comprising semiconductor nanocrystals enclosed in a polymer matrix; and a gas barrier adhesive sheet disposed on a surface of the optical material layer and comprising a gas barrier layer and an adhesion layer disposed on and in direct contact with the gas barrier layer, wherein the adhesion layer of the gas barrier adhesive sheet directly contacts with the surface of the optical material layer, wherein the gas barrier layer comprises $SiO_2$, $TiO_2$, $ZrO_2$, $ZnO_2$, $Al_2O_3$, indium tin oxide, or a combination thereof, and wherein the adhesion layer comprises a polymerization product of a composition, comprising:

first compound represented by Chemical Formula 1-6, Chemical Formula 1-7, Chemical Formula 1-8, or a combination thereof; a second compound represented by Chemical Formula 2; and a third compound represented by Chemical Formula 3:

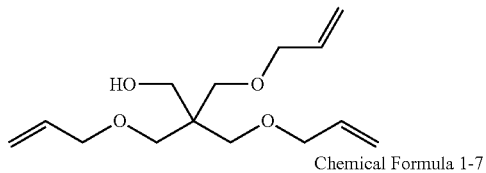

Chemical Formula 1-6

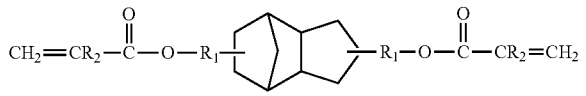

Chemical Formula 1-7 wherein in Chemical Formula 1-7, each $R_1$ is independently a substituted or unsubstituted C1 to C20 alkylene group, wherein at least one —$CH_2$— is optionally replaced with —$S(=O)_2$—, —$C(=O)$—, —O—, —S—, $S(=O)$—, —$C(=O)O$—, —$C(=O)$NR— wherein R is hydrogen or a C1 to C10 linear or branched alkyl group, —NR— wherein R is hydrogen or a C1 to C10 linear or branched alkyl group, or a combination thereof, and each $R_2$ is independently hydrogen or a methyl group;

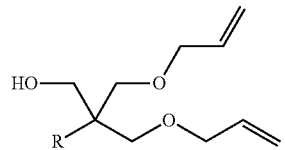

Chemical Formula 1-8 wherein in Chemical Formula 1-8, R is a C1 to C10 alkyl group;

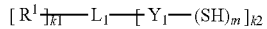

Chemical Formula 2 wherein in Chemical Formula 2, $R^1$ is selected from hydrogen; a substituted or unsubstituted C1 to C30 linear or branched alkyl group; a substituted or unsubstituted C6 to C30 aryl group; a substituted or unsubstituted C3 to C30 heteroaryl group; a substituted or unsubstituted C3 to C30 cycloalkyl group; a substituted or unsubstituted C3 to C30 heterocycloalkyl group; a C1 to C10 alkoxy group; a hydroxy group; —$NH_2$; —NRR' wherein R and R' of —NRR' are independently hydrogen or a C1 to C30 linear or branched alkyl group; an isocyanate group; a halogen; —ROR' wherein R of —ROR' is a substituted or unsubstituted C1 to C20 alkylene group and R' of —ROR' is hydrogen or a C1 to C20 linear or branched alkyl group; —RC(=O)X wherein R of —RC(=O)X is a substituted or unsubstituted alkylene group and X of —RC(=O)X is a halogen; —C(=O)OR' wherein R' of —C(=O)OR' is hydrogen or a C1 to C20 linear or branched alkyl group; —CN; or —C(=O)ONRR' wherein R and R' of —C(=O)ONRR' are independently hydrogen or a C1 to C20 linear or branched alkyl group, $L_1$ is a carbon atom, a substituted or unsubstituted C1 to C30 alkylene group, a substituted or unsubstituted C6 to C30 cycloalkylene group, a substituted or unsubstituted C6 to C30 arylene group, or a substituted or unsubstituted C6 to C30 heteroarylene group, wherein at least one —CH$_2$— in the substituted or unsubstituted C1 to C30 alkylene group is optionally replaced with —SO$_2$—, —C(O)—, —O—, —S—, —SO—, —C(=O)O—, —C(=O)NR— wherein R of —C(=O)NR— is hydrogen or a C1 to C10 alkyl group, or a combination thereof, Y$_1$ is a single bond; a substituted or unsubstituted C1 to C30 alkylene group; a substituted or unsubstituted C2 to C30 alkenylene group; a C1 to C30 alkylene group; or a C2 to C30 alkenylene group, wherein at least one —CH$_2$— is optionally replaced with —S(=O)$_2$—, —C(=O)—, —O—, —S—, —S(=O)—, —C(=O)O—, —C(=O)NR— wherein R of —C(=O)NR— is hydrogen or a C1 to C10 linear or branched alkyl group, —NR— wherein R of —NR— is hydrogen or a C1 to C10 linear or branched alkyl group, or a combination thereof, m is an integer of 1 or more, k1 is an integer of 0 or 1 or more, k2 is an integer of 1 or more, provided that the sum of m and k2 is 2 or more, m does not exceed the valence of Y$_1$, and the sum of k1 and k2 does not exceed the valence of L$_1$;

Chemical Formula 3

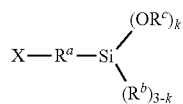

Chemical Formula 3 wherein in Chemical Formula 3,

R$^a$ is a C1 to C20 alkylene group, a C1 to C20 alkenylene group, a C1 to C20 alkynylene group, or a C1 to C20 arylene group, R$^b$ and R$^c$ are the same or different and are each independently a C1 to C20 aliphatic or alicyclic hydrocarbon group, X is a (meth)acrylate group, a mercapto group, or an epoxy group, and k is an integer of 1 to 3.

2. The optical sheet of claim 1, wherein the composition comprises 70 percent by weight to 99 percent by weight of the first compound and the second compound, and 1 percent by weight to 30 percent by weight of the third compound, based on the total weight of the composition.

3. The optical sheet of claim 1, wherein the at first compound is represented by Chemical Formula 1-7.

4. The optical sheet of claim 1, wherein the composition further comprises a fourth compound selected from the group consisting of a compound represented by Chemical Formula 1-4, a compound represented by Chemical Formula 1-5, a compound represented by Chemical Formula 1-9, a compound represented by Chemical Formula 1-10, a compound represented by Chemical Formula 1-11, a compound represented by Chemical Formula 1-12, or a combination thereof:

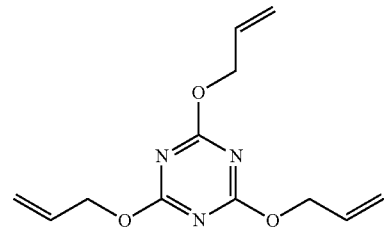

Chemical Formula 1-4

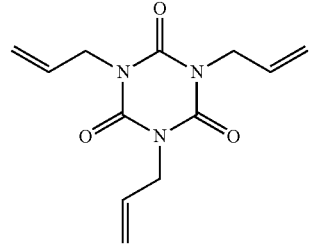

Chemical Formula 1-5

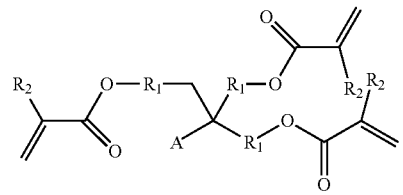

Chemical Formula 1-9 wherein in Chemical Formula 1-9,

A is a C1 to C10 alkyl group or a hydroxy group, each R$_1$ is the same or different and is indecently a single bond, a substitute or unsubstituted C1 to C20 alkylene group, wherein at least one —CH$_2$— is optionally replaced with —S(=O)$_2$—, —C(=)—, —O—, —S—, —S(=O)—, —C(=O)O—, —C(=O)NR— wherein R is hydrogen or a C1 to C10 linear or branched alkyl group, —NR— wherein R is hydrogen or a C1 or C10 linear or branched alkyl group, or a combination thereof, and each R$_2$ is independently hydrogen or a methyl, group;

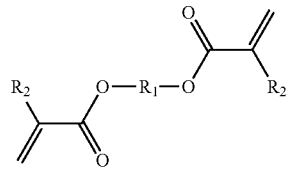

Chemical Formula 1-10 wherein in Chemical Formula 1-10,

R$_1$ is a single bond, a substituted or unsubstituted C1 to C20 alkylene group, wherein at least one —CH$_2$— is optionally replaced with —S(=O)$_2$—, —C(=O)—, —O—, —S—, —S(=O)—, —C(=O)O—, —C(=O) NR— wherein R is hydrogen or a C1 to C10 linear or branched alkyl group, —NR— wherein R is hydrogen or a C1 to C10 linear or branched alkyl group, or a combination thereof, and R$_2$ is independently hydrogen or a methyl group;

Chemical Formula 1-11

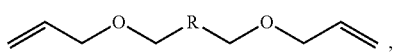

wherein in Chemical Formula 1-11,

R is a single bond, a substituted or unsubstituted C1 to C20 alkylene group, wherein at least one —CH$_2$— is optionally replaced with —S(=O)$_2$—, —C(=O)—, —O—, —S—, —S(=O)—, —C(=O)O—, —C(=O)NR'— wherein R' is hydrogen or a C1 to C10 linear or branched alkyl group, —NR'— wherein R' is hydrogen or a C1 to C10 linear or branched alkyl group, or a combination thereof, Chemical Formula 1-12

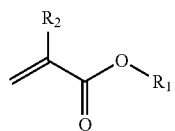

wherein in Chemical Formula 1-12,

R$_1$ is a C4 to C20 linear or branched alkyl group, and

R$_2$ is hydrogen or a methyl group.

5. The optical sheet of claim 1, wherein the second compound comprises a compound represented by Chemical Formula 2-2, a compound represented by Chemical Formula 2-3, a compound represented by Chemical Formula 2-4, a compound represented by Chemical Formula 2-5, a compound represented by Chemical Formula 2-6, or a combination thereof:

Chemical Formula 2-2

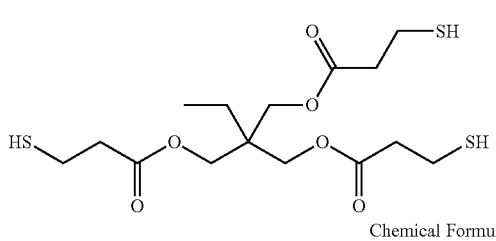

Chemical Formula 2-3

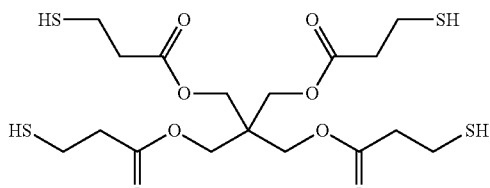

Chemical Formula 2-4

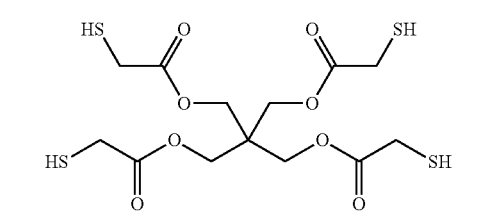

Chemical Formula 2-5

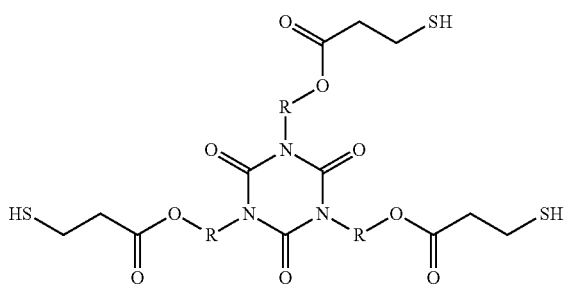

wherein in Chemical Formula 2-5,

R is independently a C1 to C20 alkylene group,

Chemical Formula 2-6

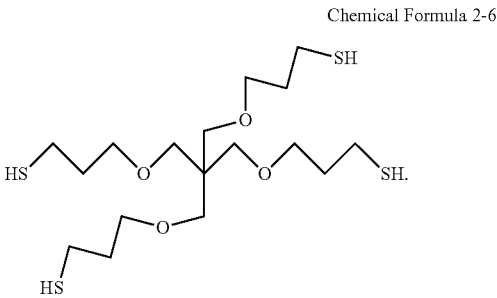 [SMILES: SCCCOCC(COCCCS)(COCCCS)COCCCS]

6. The optical sheet of claim 1, wherein the third compound is N-mercaptopropyltrimethoxysilane or 3-(trimethoxysilyl)propylmethacrylate.

7. The optical sheet of claim 1, wherein the composition further comprises a photoinitiator.

8. The optical sheet of claim 1, wherein the composition comprises 10 percent by weight to 30 percent by weight of the third compound based on the total weight of the composition.

9. The optical sheet of claim 1, wherein the adhesion layer is manufactured by coating the composition on the gas barrier layer and curing the composition.

10. The optical sheet of claim 9, wherein the curing comprises photocuring, thermal curing, or a combination thereof.

11. The optical sheet of claim 1, wherein the second compound comprises a compound represented by Chemical Formula 2-1

Chemical Formula 2-1

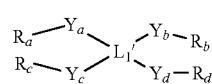

wherein in Chemical Formula 2-1,

L$_1$' is carbon atom,

Y$_a$ to Y$_d$ are independently a single bond; a substituted or unsubstituted C1 to C30 alkylene group; a substituted or unsubstituted C2 to C30 alkenylene group; a substituted or unsubstituted C2 to C30 alkylene group; or a substituted or unsubstituted C3 to C30 alkenylene group wherein at least one methylene (—CH$_2$—) is replaced with sulfonyl (—S(=O)$_2$—), carbonyl (—C(=O)—), ether (—O—), ester (—C(=O)O—), amide (—C(=O)NR—) (wherein R is hydrogen or a C1 to C10 linear or branched alkyl group), imine (—NR—) (wherein R is hydrogen or a C1 to C10 linear or branched alkyl group), or a combination thereof; and $R_a$ to $R_d$ are R' of Chemical Formula 2 or SH, provided that at least two of $R_a$ to $R_d$ is SH; and wherein the third compound comprises N-mercaptopropyltrimethoxysilane or 3-(trimethoxysilyl)propylmethacrylate.

12. The optical sheet of claim 1, further comprising a protective layer disposed on a side of the gas barrier layer, which is opposite to a side on which the adhesion layer is disposed.

13. The optical sheet of claim 12, wherein the protective layer comprises polyethyleneterephthalate, polyethylenesulfone, or polyethylenenaphthalate.

14. The optical sheet of claim 1, wherein the gas barrier layer comprises $SiO_2$.

15. The optical sheet of claim 1, wherein the polymer matrix comprises poly(meth)acrylate, epoxy, polyurea, or polyurethane.

16. The optical sheet of claim 15, wherein the polymer matrix further comprises a polymerization product of a monomer combination comprising:

at least one compound selected from the group consisting of the compound represented by Chemical Formula 1, and at least one compound selected from the group consisting of the compound represented by Chemical Formula 2:

Chemical Formula 1

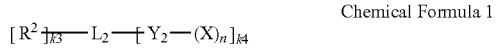

wherein in Chemical Formula 1,

X is an aliphatic organic group comprising a carbon-carbon double bond or a carbon-carbon triple bond, an aromatic organic group comprising a carbon-carbon double bond or a carbon-carbon triple bond, or an alicyclic organic group comprising a carbon-carbon double bond or a carbon-carbon triple bond, $R^2$ is selected from hydrogen; a substituted or unsubstituted C1 to C30 linear or branched alkyl group; a substituted or unsubstituted C6 to C30 aryl group; a substituted or unsubstituted C3 to C30 heteroaryl group; a substituted or unsubstituted C3 to C30 cycloalkyl group; a substituted or unsubstituted C3 to C30 heterocycloalkyl group; a C1 to C10 alkoxy group; a hydroxy group; $NH_2$; —NRR' wherein R and R' of —NRR' are independently hydrogen or a C1 to C30 linear or branched alkyl group; an isocyanate group; a halogen; —ROR' wherein R of —ROR' is a substituted or unsubstituted C1 to C20 alkylene group and R' of —ROR' is hydrogen or a C1 to C20 linear or branched alkyl group; —RC(=O)X wherein R of —RC(=O)X is a substituted or unsubstituted alkylene group and X of —RC(=O)X is a halogen; —C(=O)OR' wherein R' of —C(=O)OR' is hydrogen or a C1 to C20 linear or branched alkyl group; —CN; or —C(=O)ONRR' wherein R and R' of —C(=O)ONRR' are independently hydrogen or a C1 to C20 linear or branched alkyl group, $L_2$ is a carbon atom, a substituted or unsubstituted C1 to C30 alkylene group, a substituted or unsubstituted C6 to C30 cycloalkylene group, a substituted or unsubstituted C6 to C30 arylene group, or a substituted or unsubstituted C3 to C30 heteroarylene group, $Y_2$ is a single bond; a substituted or unsubstituted C1 to C30 alkylene group; a substituted or unsubstituted C2 to C30 alkenylene group; or a C1 to C30 alkylene group or a C2 to C30 alkenylene group, wherein at least one —$CH_2$— is optionally replaced with —S(=O)$_2$—, —C(=O)—, —O—, —S—, —S(=O)—, —C(=O)O—, —C(=O)NR— wherein R of —C(=O)NR— is hydrogen or a C1 to C10 linear or branched alkyl group, —NR— wherein R of —NR— is hydrogen or a C1 to C10 linear or branched alkyl group, or a combination thereof, n is an integer of 1 or more, k3 is an integer of 0 or 1 or more, k4 is an integer of 1 or more, provided that the sum of n and k4 is 2 or more, n does not exceed the valence of $Y_2$, and the sum of k3 and k4 does not exceed the valence of $L_2$;

Chemical Formula 2

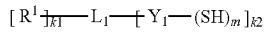

wherein in Chemical Formula 2, $R^1$ is selected from hydrogen; a substituted or unsubstituted C1 to C30 linear or branched alkyl group; a substituted or unsubstituted C6 to C30 aryl group; a substituted or unsubstituted C3 to C30 heteroaryl group; a substituted or unsubstituted C3 to C30 cycloalkyl group; a substituted or unsubstituted C3 to C30 heterocycloalkyl group; a C1 to C10 alkoxy group; a hydroxy group; —$NH_2$; —NRR' wherein R and R' of —NRR' are independently hydrogen or a C1 to C30 linear or branched alkyl group; an isocyanate group; a halogen; —ROR' wherein R of —ROR' is a substituted or unsubstituted C1 to C20 alkylene group and R' of —ROR' is hydrogen or a C1 to C20 linear or branched alkyl group; —RC(=O)X wherein R of —RC(=O)X is a substituted or unsubstituted alkylene group and X of —RC(=O)X is a halogen; —C(=O)OR' wherein R' of —C(=O)OR' is hydrogen or a C1 to C20 linear or branched alkyl group; —CN; or —C(=O)ONRR' wherein R and R' of —C(=O)ONRR' are independently hydrogen or a C1 to C20 linear or branched alkyl group, $L_1$ is a carbon atom, a substituted or unsubstituted C1 to C30 alkylene group, a substituted or unsubstituted C6 to C30 cycloalkylene group, a substituted or unsubstituted C6 to C30 arylene group, or a substituted or unsubstituted C6 to C30 heteroarylene group, wherein at least one —$CH_2$— in the substituted C1 to C30 alkylene group is optionally replaced with —$SO_2$—, —C(O)—, —O—, —S—, —SO—, —C(=O)O—, —C(=O)NR— wherein R of —C(=O)NR— is hydrogen or a C1 to C10 alkyl group, or a combination thereof, $Y_1$ is a single bond; a substituted or unsubstituted C1 to C30 alkylene group; a substituted or unsubstituted C2 to C30 alkenylene group; a C1 to C30 alkylene group or a C2 to C30 alkenylene group, wherein at least one —$CH_2$— is optionally replaced with —S(=O)$_2$—, —C(=O)—, —O—, —S—, —S(=O)—, —C(=O)O—, —C(=O)NR— wherein R of —C(=O)NR— is hydrogen or a C1 to C10 linear or branched alkyl group, —NR— wherein R of —NR— is hydrogen or a C1 to C10 linear or branched alkyl group, or a combination thereof, m is an integer of 1 or more,
k1 is an integer of 0 or 1 or more,
k2 is an integer of 1 or more,
provided that the sum of m and k2 is 2 or more, m does not exceed the valence of $Y_1$, and the sum of k1 and k2 does not exceed the valence of $L_1$.

17. An optical device comprising the optical sheet of claim 1.

18. The optical device of claim 17, wherein the optical device comprises a backlight unit or a liquid crystal display.

19. An optical sheet including a single optical material layer comprising semiconductor nanocrystals enclosed in a polymer matrix; and a gas barrier adhesive sheet disposed on a surface of the optical material layer and comprising a gas barrier layer and an adhesion layer disposed on and in direct contact with the gas barrier layer,
    wherein the adhesion layer of the gas barrier adhesive sheet directly contacts with the surface of the optical material layer,
    wherein the gas barrier layer comprises $SiO_2$, $TiO_2$, $ZrO_2$, $ZnO_2$, $Al_2O_3$, indium tin oxide, or a combination thereof, and
    wherein the adhesion layer comprises a polymerization product of a composition, comprising pentaerythritol tetrakis(3-mercaptopropionate), 1,3,5-triallyl-1,3,5-triazine-2,4,6(1H,3H,5H)-trione, and 3-(trimethoxysilyl)propyl methacrylate, and
    wherein the 3-(trimethoxysilyl)propyl methacrylate comprises 10 percent by weight to 30 percent by weight of the total weight of the composition.

20. An optical sheet including a single optical material layer comprising semiconductor nanocrystals enclosed in a polymer matrix; and a gas barrier adhesive sheet disposed on a surface of the optical material layer and comprising a gas barrier layer and an adhesion layer disposed on and in direct contact with the gas barrier layer,
    wherein the adhesion layer of the gas barrier adhesive sheet directly contacts with the surface of the optical material layer,
    wherein the gas barrier layer comprises $SiO_2$, $TiO_2$, $ZrO_2$, $ZnO_2$, $Al_2O_3$, indium tin oxide, or a combination thereof, and
    wherein the adhesion layer comprises a polymerization product of a composition, comprising tricyclodecane dimethanol diacrylate, 1,6-Hexanediol diacrylate, 1,3,5-triallyl-1,3,5-triazine-2,4,6(1H,3H,5H)-trione, and 3-(trimethoxysilyl)propyl methacrylate.

* * * * *